US008730120B2

(12) United States Patent  
Deguchi et al.

(10) Patent No.: US 8,730,120 B2  
(45) Date of Patent: May 20, 2014

(54) TRANSMISSION/RECEPTION ANTENNA AND TRANSMISSION/RECEPTION DEVICE USING SAME

(75) Inventors: Futoshi Deguchi, Fukuoka (JP); Youichirou Honda, Miyazaki (JP); Yoshinori Hashimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 210 days.

(21) Appl. No.: 13/293,508

(22) Filed: Nov. 10, 2011

(65) Prior Publication Data

US 2012/0119965 A1 May 17, 2012

(30) Foreign Application Priority Data

Nov. 12, 2010 (JP) .................................. 2010-253438  
Feb. 10, 2011 (JP) .................................. 2011-026774

(51) Int. Cl.  
*H01Q 7/08* (2006.01)

(52) U.S. Cl.  
USPC ........................................................ 343/788

(58) Field of Classification Search  
USPC ........................................................ 343/788  
See application file for complete search history.

(56) References Cited

U.S. PATENT DOCUMENTS

| | | | | |
|---|---|---|---|---|
| 7,623,929 | B1 * | 11/2009 | Griffith | 607/57 |
| 2002/0003503 | A1 * | 1/2002 | Justice | 343/788 |
| 2003/0218526 | A1 * | 11/2003 | Fan | 336/83 |
| 2004/0252068 | A1 * | 12/2004 | Hall et al. | 343/788 |
| 2005/0134515 | A1 * | 6/2005 | Copeland et al. | 343/788 |
| 2006/0176229 | A1 * | 8/2006 | Copeland et al. | 343/788 |
| 2006/0244673 | A1 * | 11/2006 | Schantz et al. | 343/788 |
| 2009/0009418 | A1 * | 1/2009 | Masin et al. | 343/788 |
| 2011/0241957 | A1 * | 10/2011 | Ohara | 343/788 |

FOREIGN PATENT DOCUMENTS

JP 2007-199871 8/2007

\* cited by examiner

*Primary Examiner* — Jerome Jackson, Jr.  
*Assistant Examiner* — Andrea Lindgren Baltzel  
(74) *Attorney, Agent, or Firm* — Dickinson Wright PLLC

(57) ABSTRACT

Provided are a transmission/reception antenna and a transmission/reception device using the same wherein the transmission/reception antenna comprises an excitation loop antenna (12) having a loop of a single turn and a transmission/reception loop antenna (14) having a pair of loops (14a, 14b) of a plurality of turns which are closely wound around a magnetic member (11). The two loops of the transmission/reception loop antenna are located on either side of the excitation loop. A resonance capacitor (15) is connected across one ends of the two loops of the transmission/reception loop antenna, and a connecting portion (14c) is connected between the ends of the two loops opposite to those connected to the resonance capacitor. The frequency property is expanded without increasing the power consumption.

8 Claims, 26 Drawing Sheets

# TRANSMISSION/RECEPTION ANTENNA AND TRANSMISSION/RECEPTION DEVICE USING SAME

TECHNICAL FIELD

The present invention relates to a transmission/reception antenna for supplying electric power to wireless communication media such as RFID tags and contactless smart cards and exchanging signals with the wireless communication media, and a transmission/reception device using the same.

BACKGROUND OF THE INVENTION

In recent years, the technology for identifying objects and authenticating individuals has come to be widely used in supply chain and logistics systems, traffic systems, inventory management systems, book management systems, personal verification systems and electronic money systems by using wireless communication media such as RFID tags and contactless smart cards. A system based on wireless communication media uses a transmission/reception device for exchanging signals with the wireless communication media. In such a system, it is advantageous if a single transmission/reception device can communicate with wireless communication media of a number of different kinds.

However, the communication protocol of the wireless communication media may differ from one system to another. Oftentimes, the bandwidth for the communication between the transmission/reception device and the wireless communication media vary from one system to another so that it is desirable for the transmission/reception device to be able to cover a wide frequency range. To meet such a need, it has been proposed to provide a plurality of resistors in the transmission/reception signal path of a transmission/reception antenna and to switch between the resistors so as to expand the frequency range of the transmission/reception device as disclosed in JP 2007-199871.

However, according to this prior art, because the resistors are always present in the transmission/reception signal path of the transmission/reception antenna, some power loss is inevitable, and the power consumption is undesirably great.

BRIEF SUMMARY OF THE INVENTION

In view of such problems of the prior art, a primary object of the present invention is to provide a transmission/reception device that is configured to achieve a wide frequency range.

To achieve such an object, the present invention provides a transmission/reception antenna, comprising: a magnetic member; an excitation loop antenna disposed on the magnetic member; a transmission/reception loop antenna disposed on the magnetic member adjacent to but not in contact with the excitation loop antenna; and a resonance capacitor connected between two ends of the transmission/reception loop antenna; wherein the excitation loop antenna comprises a loop of a single turn, and the transmission/reception loop antenna comprises a loop of a plurality of turns, the excitation loop antenna and the transmission/reception loop antenna being coaxially wound around the magnetic member.

According to the present invention, when a transmission signal is forwarded to the excitation loop antenna, the transmission signal is transmitted from the excitation loop antenna to the transmission/reception loop antenna by magnetic induction, and the transmission signal is amplified before being transmitted from the transmission/reception loop antenna. By placing the excitation loop antenna in close proximity to the transmission/reception loop antenna, and thereby achieving a relatively high coupling coefficient between the excitation loop antenna and the transmission/reception loop antenna, the frequency range can be expanded. As no resistor is required to be interposed in a path for forwarding and receiving signals to and from the transmission/reception loop antenna, an increase in the power consumption can be avoided.

In particular, the directions of the electric current flowing through the excitation loop antenna and the transmission/reception loop antenna are opposite to each other so that the magnetic flux created by the electric current flowing through the excitation loop antenna attenuates the magnetic flux created by the electric current flowing through the transmission/reception loop antenna. However, as the transmission/reception loop antenna has a loop of a plurality of turns while the excitation loop antenna has a loop of only a single turn, the attenuation in the magnetic flux created in the transmission/reception loop antenna can be controlled. Thereby, a transmission signal of an adequate power can be transmitted from the transmission/reception loop antenna without increasing the transmission power of the excitation loop antenna, and the consumption of power can be minimized.

According to the transmission/reception antenna of the present invention, a wide frequency property can be achieved while the power consumption is minimized. In particular, according to the present invention, by appropriately setting the coupling coefficient between the excitation loop antenna and the transmission/reception loop antenna, the frequency property can be expanded. Furthermore, as the expansion of the frequency property can be achieved without placing a resistor in the transmission/reception signal path of the transmission/reception antenna, the power consumption can be kept low.

According to the present invention, even when the size of the magnetic base board or magnetic member is limited, the sizes and shapes of the excitation loop antenna and the transmission/reception loop antenna, as well as the coupling coefficient between them, can be appropriately set. Therefore, the expansion of the frequency property and the reduction in the power consumption can be achieved at the same time.

The transmission/reception device of the present invention comprises such a transmission/reception antenna; a transmission processing unit for forwarding a transmission signal to the transmission/reception antenna; a reception processing unit for receiving a reception signal from the transmission/reception antenna; and a control unit for controlling the transmission processing unit and the reception processing unit. Therefore, for the reasons discussed above, the expansion of the frequency property and the reduction in the power consumption can be achieved at the same time.

As discussed above, the transmission/reception antenna and the transmission/reception device of the present invention can expand the frequency property without increasing the power consumption, and are highly useful as a transmission/reception antenna and a transmission/reception device for supplying electric power to wireless communication media such as RFD tags and contactless smart cards and exchanging signals with the wireless communication media.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
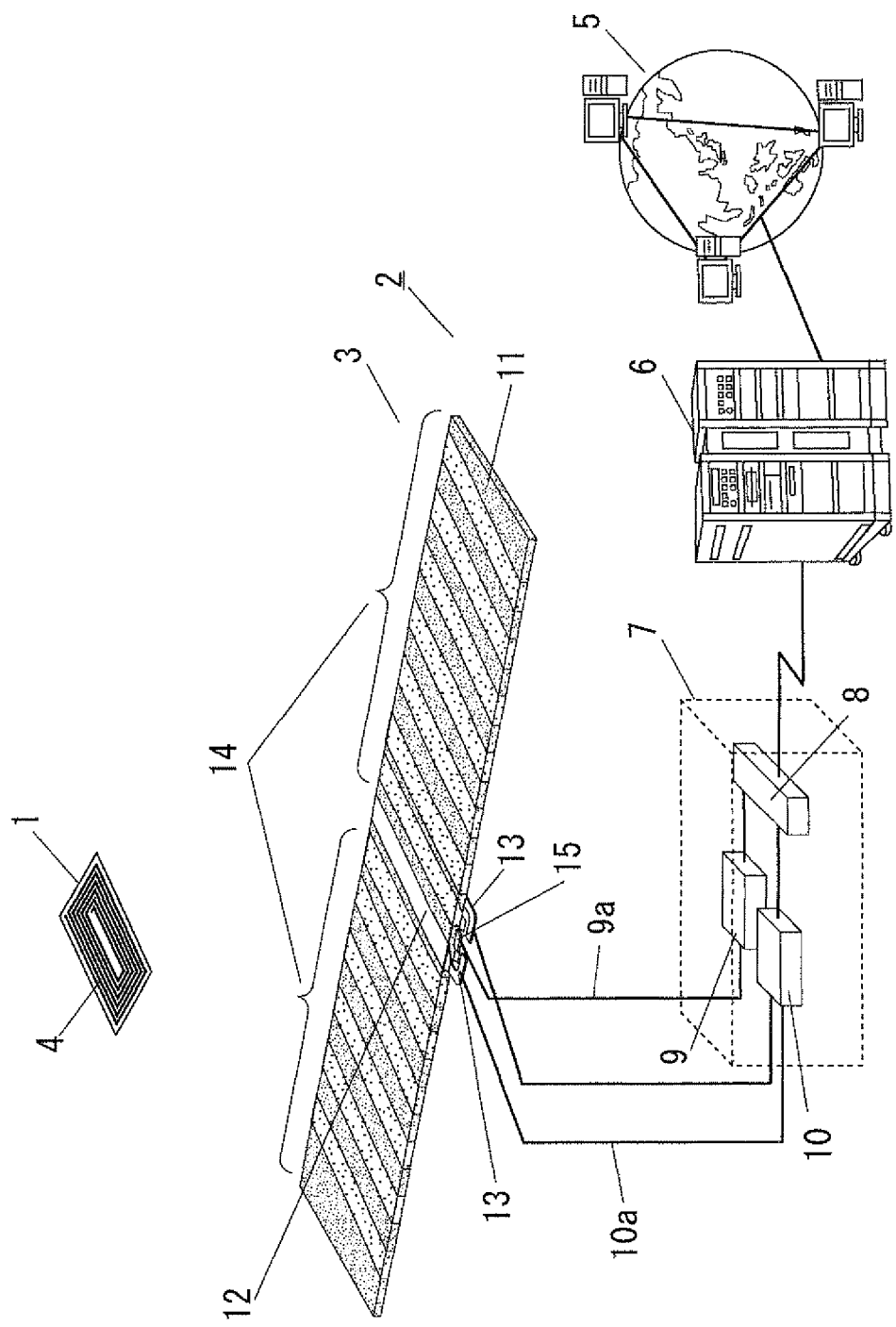
FIG. 1 is a block diagram showing a contactless smart card system according to a first embodiment of the present invention.

According to a first aspect of the present invention, in order to achieve the object mentioned above, the present invention provides a transmission/reception antenna, comprising: a magnetic member; an excitation loop antenna disposed on the magnetic member; a transmission/reception loop antenna disposed on the magnetic member adjacent to but not in contact with the excitation loop antenna; and a resonance capacitor connected between two ends of the transmission/reception loop antenna; wherein the excitation loop antenna comprises a loop of a single turn, and the transmission/reception loop antenna comprises a loop of a plurality of turns, the excitation loop antenna and the transmission/reception loop antenna being coaxially wound around the magnetic member.

According to this aspect of the present invention, when a transmission signal is forwarded to the excitation loop antenna, the transmission signal is transmitted from the excitation loop antenna to the transmission/reception loop antenna by magnetic induction, and the transmission signal is amplified before being transmitted from the transmission/reception loop antenna. By placing the excitation loop antenna in close proximity to the transmission/reception loop antenna, and thereby achieving a relatively high coupling coefficient between the excitation loop antenna and the transmission/reception loop antenna, the frequency range can be expanded. As no resistor is required to be interposed in a path for forwarding and receiving signals to and from the transmission/reception loop antenna, an increase in the power consumption can be avoided.

In particular, the directions of the electric current flowing through the excitation loop antenna and the transmission/reception loop antenna are opposite to each other so that the magnetic flux created by the electric current flowing through the excitation loop antenna attenuates the magnetic flux created by the electric current flowing through the transmission/reception loop antenna. However, as the transmission/reception loop antenna has a loop of a plurality of turns while the excitation loop antenna has a loop of only a single turn, the attenuation in the magnetic flux created in the transmission/reception loop antenna can be controlled. Thereby, a transmission signal of an adequate power can be transmitted from the transmission/reception loop antenna without increasing the transmission power of the excitation loop antenna, and the consumption of power can be minimized.

According to a second aspect of the present invention, in the arrangement based on the first aspect of the present invention, a coupling coefficient K between the excitation loop antenna and the transmission/reception loop antenna is in a rage of 0.5 to 0.7.

Thereby, a high overall communication performance combining a high transmission performance and a high reception performance can be achieved.

According to a third aspect of the present invention, the present invention provides a transmission/reception antenna, comprising: a magnetic member; an excitation loop antenna disposed on the magnetic member; a pair of transmission processing unit connecting terminals connected to the excitation loop antenna and configured to be connected to a transmission processing unit; a transmission/reception loop antenna disposed on the magnetic member adjacent to but not in contact with the excitation loop antenna, and including a first loop of a plurality of turns, a second loop of a plurality of turns and a connecting portion connecting one end of the first loop to one end of the second loop; a pair of reception processing unit connecting terminals connected to opposite ends of the first and second loops to the one ends thereof and configured to be connected to a reception processing unit; and a resonance capacitor connected between the opposite ends of the first and second loops of the transmission/reception loop antenna; wherein the first and second loops of the transmission/reception loop antenna are located on either side of the excitation loop antenna.

According to this aspect of the present invention, when a transmission signal is forwarded to the excitation loop antenna, the transmission signal is transmitted from the excitation loop antenna to the transmission/reception loop antenna by magnetic induction, and the transmission signal is amplified before being transmitted from the transmission/reception loop antenna. By placing the excitation loop antenna in close proximity to the transmission/reception loop antenna, and thereby achieving a relatively high coupling coefficient between the excitation loop antenna and the transmission/reception loop antenna, the frequency range can be expanded. As no resistor is required to be interposed in a path for forwarding and receiving signals to and from the transmission/reception loop antenna, an increase in the power consumption can be avoided.

According to a fourth aspect of the present invention, in the arrangement based on the third aspect of the present invention, the magnetic member is shaped as a plate member, and is closely surrounded by each loop of the excitation loop antenna and the transmission/reception loop antenna.

Thereby, the transmission of a signal from the transmission/reception antenna and the reception of a signal from the wireless communication medium can be performed in an efficient manner.

According to a fifth aspect of the present invention, in the arrangement based on the third aspect of the present invention, the transmission processing unit connecting terminals are located on either side of the resonance capacitor.

Thereby, the thickness of the transmission/reception antenna can be minimized, and the transmission processing unit and the reception processing unit may be spaced from each other so that the interferences that could occur between them can be minimized.

According to a sixth aspect of the present invention, in the arrangement based on the third aspect of the present invention, one of the excitation loop antenna and the transmission/reception loop antenna is wound directly around the magnetic member, and the other of the antennas is wound around the one antenna via an insulating layer.

According to this arrangement, because the excitation loop antenna 12 and the transmission/reception loop antenna 14 of the transmission/reception antenna can be designed and wound individually, the spacing between the loops of the excitation loop antenna 12 and the transmission/reception loop antenna 14 and the numbers of turns of the excitation loop antenna 12 and the transmission/reception loop antenna 14 can be changed with regard to only one of the loop antennas without changing the other loop antenna. Also, the short circuiting between the excitation loop antenna 12 and the transmission/reception loop antenna 14 can be avoided without requiring a high positional precision. Furthermore, as the excitation loop antenna 12 and the transmission/reception loop antenna 14 are layered one over the other, the number of turns of the transmission/reception loop antenna 14 can be increased even when the available space is limited.

According to a seventh aspect of the present invention, in the arrangement based on the third aspect of the present invention, a coupling coefficient K between the excitation loop antenna and the transmission/reception loop antenna is in a rage of 0.5 to 0.7.

Thereby, a high overall communication performance combining a high transmission performance and a high reception performance can be achieved.

According to an eighth aspect of the present invention, the present invention provides a transmission/reception antenna comprising: a magnetic member; an excitation loop antenna disposed on the magnetic member: a transmission/reception loop antenna disposed on the magnetic member adjacent to but not in contact with the excitation loop antenna; and a resonance capacitor connected between two ends of the transmission/reception loop antenna; wherein the magnetic member comprises a base portion configured to be fixedly attached to a base board and a columnar portion extending from the base portion perpendicularly with respect to a major plane of the base portion; and wherein the excitation loop antenna includes a loop of a single turn wound around the columnar portion of the magnetic member and the transmission/reception loop antenna includes a loop of a plurality of turns wound around the columnar portion of the magnetic member coaxially with respect to the loop of the excitation loop antenna.

According to this aspect of the present invention, when a transmission signal is forwarded to the excitation loop antenna, the transmission signal is transmitted from the excitation loop antenna to the transmission/reception loop antenna by magnetic induction, and the transmission signal is amplified before being transmitted from the transmission/reception loop antenna. By placing the excitation loop antenna in close proximity to the transmission/reception loop antenna, and thereby achieving a relatively high coupling coefficient between the excitation loop antenna and the transmission/reception loop antenna, the frequency range can be expanded. As no resistor is required to be interposed in a path for forwarding and receiving signals to and from the transmission/reception loop antenna, an increase in the power consumption can be avoided.

In particular, the directions of the electric current flowing through the excitation loop antenna and the transmission/reception loop antenna are opposite to each other so that the magnetic flux created by the electric current flowing through the excitation loop antenna attenuates the magnetic flux created by the electric current flowing through the transmission/reception loop antenna. However, as the transmission/reception loop antenna has a loop of a plurality of turns while the excitation loop antenna has a loop of only a single turn, the attenuation in the magnetic flux created in the transmission/reception loop antenna can be controlled. Thereby, a transmission signal of an adequate power can be transmitted from the transmission/reception loop antenna without increasing the transmission power of the excitation loop antenna, and the consumption of power can be minimized.

According to a ninth aspect of the present invention, in the arrangement based on the eighth aspect of the present invention, the excitation loop antenna is disposed on a part of the columnar portion adjacent to the base portion, and the transmission/reception loop antenna is disposed on a part of the columnar portion comparatively remote from the base portion.

Thereby, the transmission of a signal from the transmission/reception antenna and the reception of a signal from the wireless communication medium can be performed in an efficient manner.

According to a tenth aspect of the present invention, in the arrangement based on the eighth aspect of the present invention, the base portion has a greater diameter than the excitation loop antenna and the transmission/reception loop antenna.

Thereby, the transmission/reception antenna is prevented from being magnetically interfered by a component mounted on the base board, in particular on the side of the base board facing away from the transmission/reception antenna.

According to an eleventh aspect of the present invention, in the arrangement based on the eighth aspect of the present invention, a coupling coefficient K between the excitation loop antenna and the transmission/reception loop antenna is in a rage of 0.5 to 0.7.

Thereby, a high overall communication performance combining a high transmission performance and a high reception performance can be achieved.

According to a twelfth aspect of the present invention, the present invention provides a transmission/reception device, comprising: a transmission/reception antenna according to the first aspect of the present invention; a transmission processing unit for forwarding a transmission signal to the transmission/reception antenna; a reception processing unit for receiving a reception signal from the transmission/reception antenna; and a control unit for controlling the transmission processing unit and the reception processing unit; wherein the excitation loop antenna is connected to the transmission processing unit, and the transmission/reception loop antenna is connected to the reception processing unit.

For the same reasons as those discussed above, the frequency range can be expanded without increasing the power consumption.

According to a thirteenth aspect of the present invention, the present invention provides a transmission/reception device, comprising: a transmission/reception antenna according to the third aspect of the present invention; a transmission processing unit for forwarding a transmission signal to the transmission/reception antenna; a reception processing unit for receiving a reception signal from the transmission/reception antenna; and a control unit for controlling the transmission processing unit and the reception processing unit; wherein the excitation loop antenna is connected to the transmission processing unit, and the transmission/reception loop antenna is connected to the reception processing unit.

For the same reasons as those discussed above, the frequency range can be expanded without increasing the power consumption.

According to a fourteenth aspect of the present invention, the present invention provides a transmission/reception device, comprising: a transmission/reception antenna according to the eighth aspect of the present invention; a transmission processing unit for forwarding a transmission signal to the transmission/reception antenna; a reception processing unit for receiving a reception signal from the transmission/reception antenna; and a control unit for controlling the transmission processing unit and the reception processing unit; wherein the excitation loop antenna is connected to the transmission processing unit, and the transmission/reception loop antenna is connected to the reception processing unit.

For the same reasons as those discussed above, the frequency range can be expanded without increasing the power consumption.

A transmission/reception antenna and a transmission/reception device using the same according to the present invention are described in the following with reference to the appended drawings. The embodiments of the present invention described in the following are only exemplary, and are incorporated with various features that are technically desirable but may not be essential for the present invention. Therefore, the scope of the present invention should not be limited by the embodiments described in the following unless specifically defined otherwise. Each of the preferred embodiments is now described in the following with reference to the associated drawings.

Embodiment 1

FIG. 1 is a block diagram of a contactless smart card of the first embodiment that uses a frequency band of 13.56 MHz, and is intended to be used in supply chain and logistics systems, traffic systems, inventory management systems, book management systems, personal verification systems, and so on.

More specifically, electric power and transmission data are supplied from a transmission/reception antenna 3 of a transmission/reception device 2 to a wireless communication medium 1 such as a RFID tag attached to a piece of merchandise and a contactless smart card for personal verification.

The wireless communication medium 1 includes a transmission/reception loop antenna 4 and a control IC (not shown in the drawings) connected thereto, and a detailed description thereof is omitted here as it is per se known.

The transmission/reception device 2 includes a control device 6 connected to a network line 5 and a reader/writer device 7 for the control device 6.

The reader/writer device 7 includes a control unit 8 connected to the control device 6, and a reception processing unit 9 and a transmission processing unit 10 connected to the control unit 8.

Figure 2:
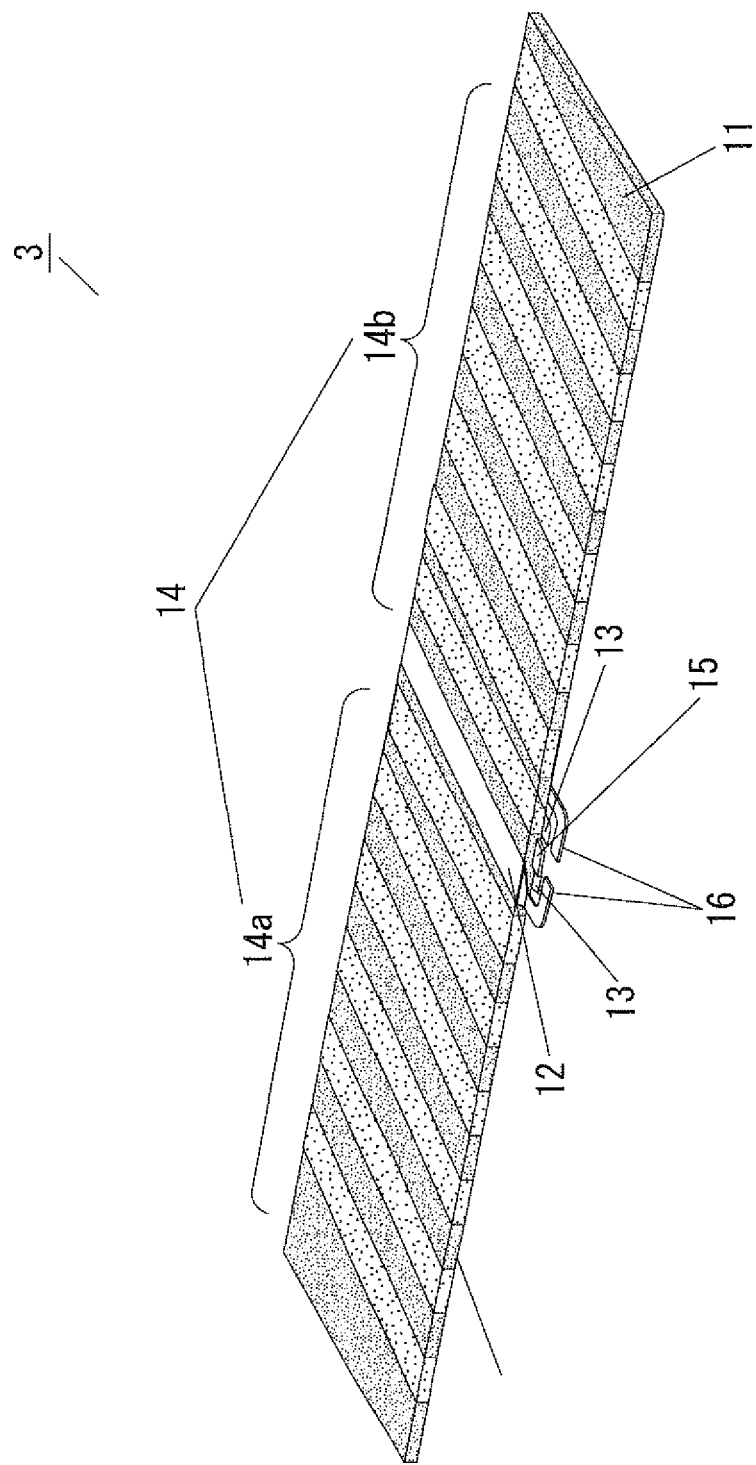
FIG. 2 is a perspective view showing a transmission/reception antenna 3 of a transmission/reception device according to the first embodiment of the present invention.
Figure 3:
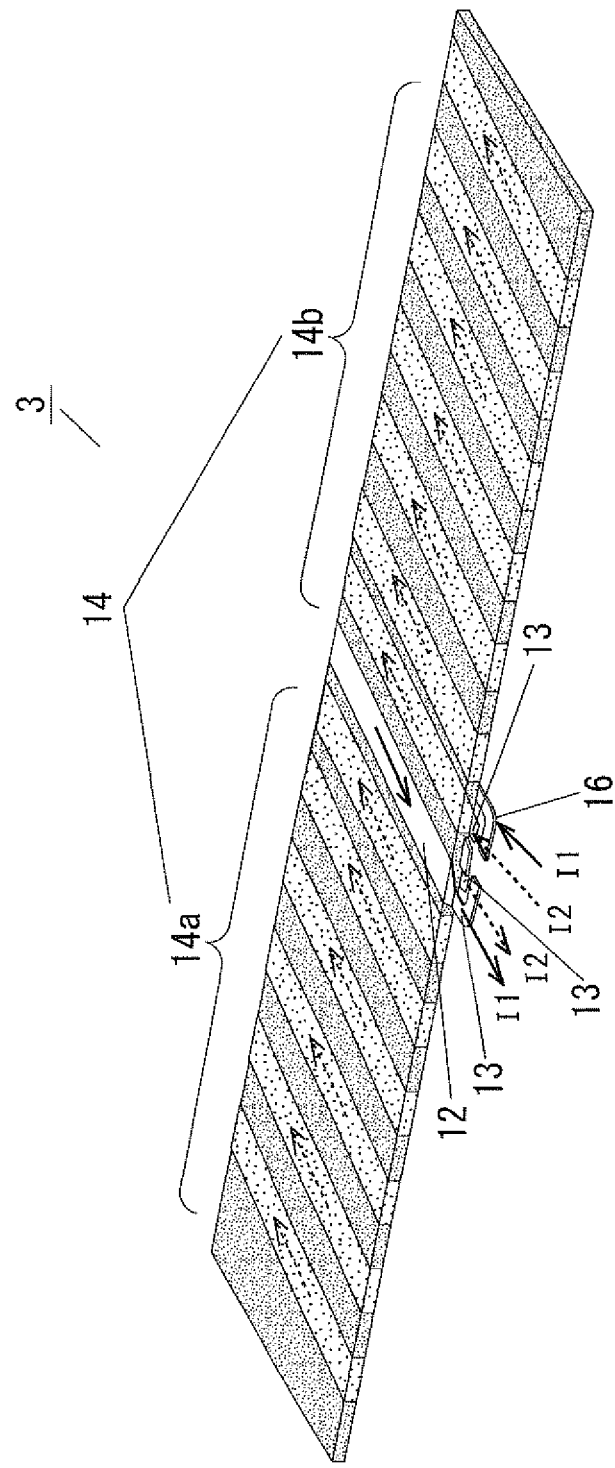
FIG. 3 is a perspective view showing the directions of electric current conducted through each loop of the transmission/reception antenna 3.
Figure 4:
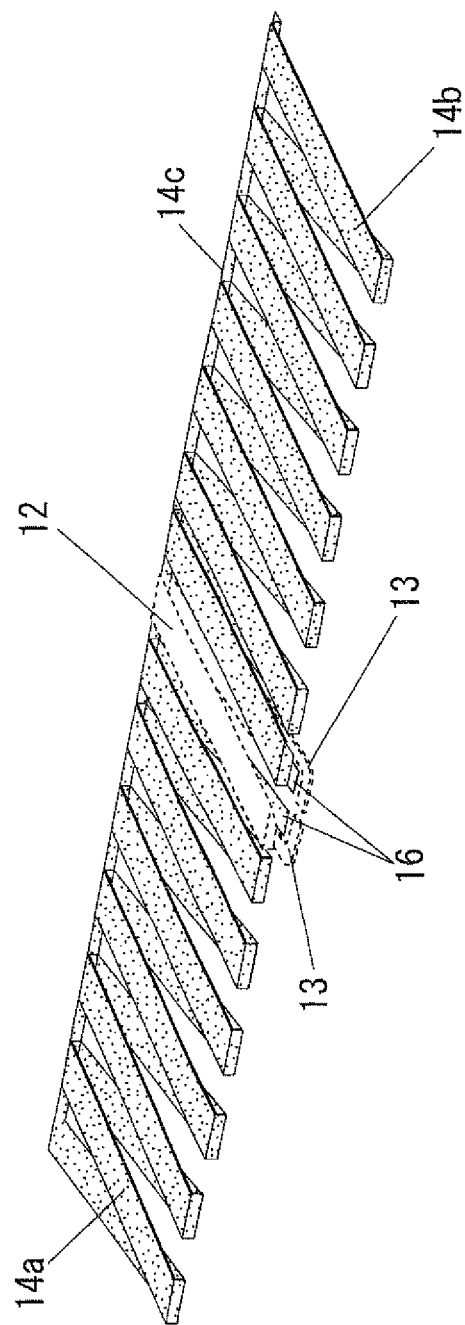
FIG. 4 is a fragmentary perspective view of a transmission/reception loop antenna 14 included in the transmission/reception antenna 3.
Figure 5:
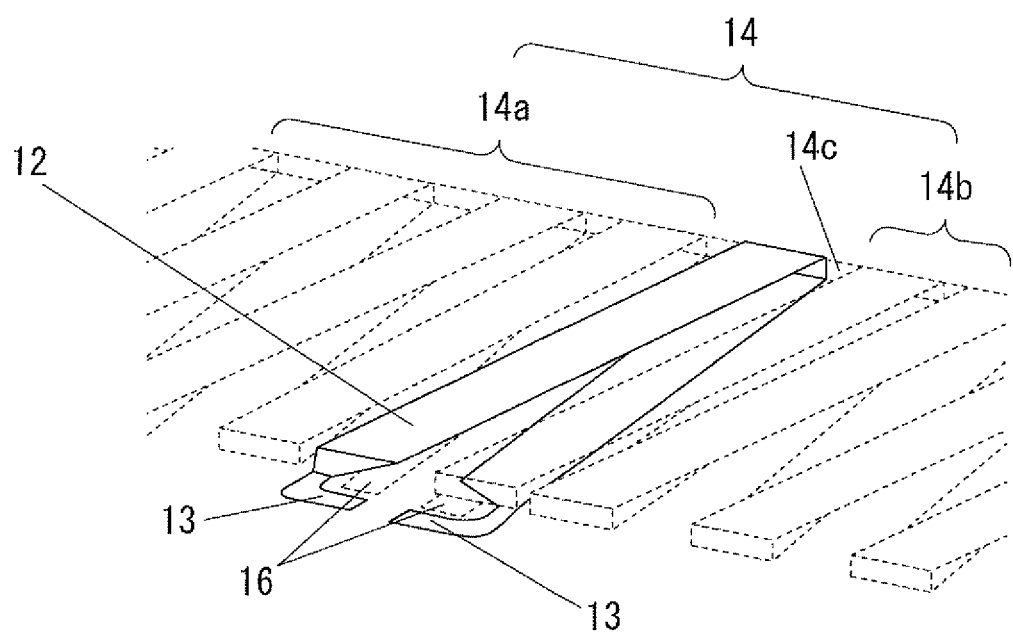
FIG. 5 is a fragmentary perspective view of an excitation loop antenna 12 included in the transmission/reception antenna 3.
Figure 6:
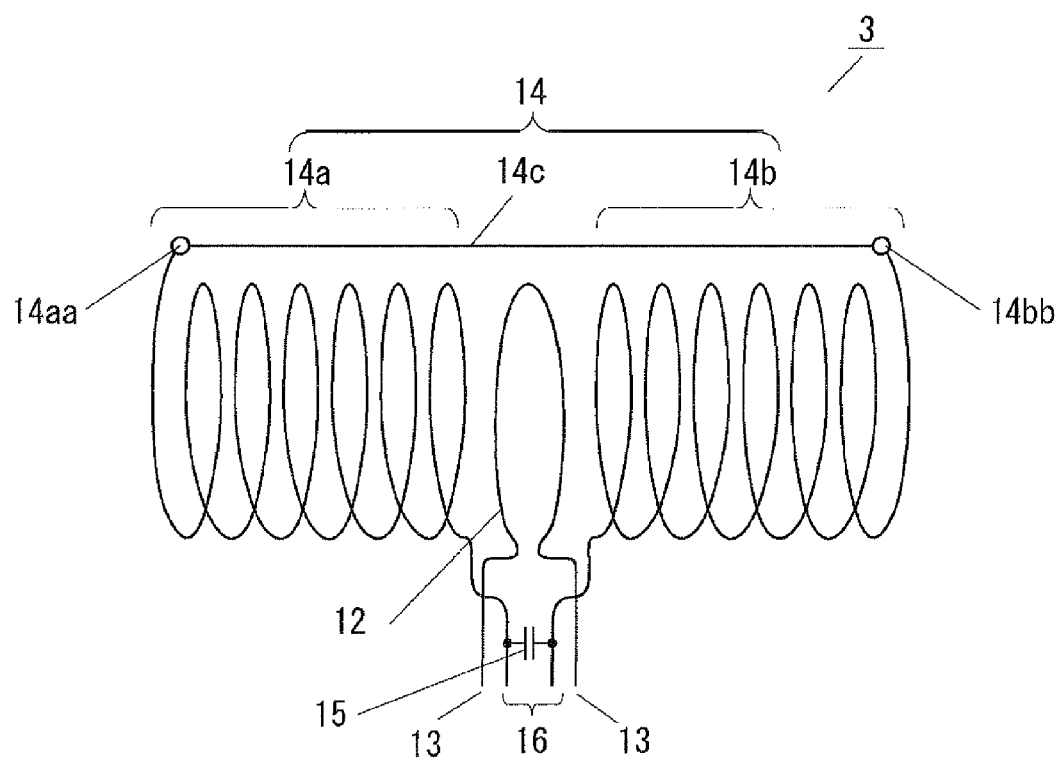
FIG. 6 is a diagram showing the relationship between the excitation loop antenna 12 and the transmission/reception loop antenna 14 included in the transmission/reception antenna 3.

FIG. 2 is a perspective view showing the transmission/reception antenna 3 of the transmission/reception device 2 of the first embodiment, and FIG. 3 is a diagram showing the direction of electric current flowing in each loop of the transmission/reception antenna 3. FIG. 4 is a simplified perspective view showing a transmission/reception loop antenna 14 included in the transmission/reception antenna 3, and FIG. 5 is a simplified perspective view of an excitation loop antenna 12 included in the transmission/reception antenna 3. FIG. 6 is a diagram illustrating the relationship between the excitation loop antenna 12 and the transmission/reception loop antenna 14 included in the transmission/reception antenna 3. In FIGS. 4 to 6, a magnetic member 11 is omitted from the illustration in order to clearly show the structures of the excitation loop antenna 12 and the transmission/reception loop antenna 14 and the relationship between them. In the transmission/reception antenna 3 shown in FIG. 6, a connecting line from the excitation loop antenna 12 to a transmission processing unit connection terminal 13, and a connecting line from the transmission/reception loop antenna 14 to a reception processing unit connection terminal 16 are not in contact with each other.

As shown in FIGS. 2 to 6, the transmission/reception antenna 3 includes a magnetic member (magnetic base board) 11, a excitation loop antenna 12 provided on the magnetic member 11, a pair of transmission processing unit connecting terminals 13 connected to the excitation loop antenna 12, a transmission/reception loop antenna 14 provided on the magnetic member 11 adjacent to and not in contact with the excitation loop antenna 12, a resonance capacitor 15 connected across the two ends of the transmission/reception loop antenna 14 and a pair of reception processing unit connecting terminals 16 connected to the transmission/reception loop antenna 14, and the magnetic member 11 is wrapped inside the loop of each of the excitation loop antenna 12 and the transmission/reception loop antenna 14. In this embodiment, the magnetic member 11 consists of a planar sheet or plate, and is closely surrounded by the inner periphery of the loop of each of the excitation loop antenna 12 and the transmission/reception loop antenna 14. Therefore, the magnetic flux produced by the electric current conducted through the transmission/reception loop antenna 14 is concentrated in the magnetic member 11, and magnetic flux leakage can be minimized so that the magnetic energy may be efficiently contained in the magnetic member 11.

The transmission processing unit 10 is connected to the transmission processing unit connecting terminals 13, and the reception processing unit 9 is connected to the reception processing unit connecting terminals 16.

More specifically, the transmission signal from the transmission processing unit 10 is forwarded to the excitation loop antenna 12 via a filter circuit 10a and the transmission processing unit connecting terminals 13, and is then forwarded to the transmission/reception loop antenna 14 by magnetic induction before being transmitted from the transmission/reception loop antenna 14 to the wireless communication medium 1.

The wireless communication medium 1 receives the transmission signal with the transmission/reception loop antenna 14, and thereby receives the supply of electric power and the signal transmission.

The transmission signal emitted from the wireless communication medium 1 in response to the transmission signal from the transmission/reception device 2 is received by the transmission/reception loop antenna 14, and is then forwarded to the reception processing unit 9 via the reception processing unit connecting terminals 16 and a filter circuit 9a before being forwarded to the control device 6 via the control unit 8.

As shown in FIGS. 2 to 6, in particular in FIG. 5, the excitation loop antenna 12 consists of a rectangularly wound single-turn coil. As best shown in FIGS. 4 and 6, the transmission/reception loop antenna 14 includes a first loop 14a including a plurality of turns and a second loop 14b also including a plurality of turns.

More specifically, as shown in FIGS. 2 to 6, in particular in FIGS. 4 and 6, the first loop 14a and second loop 14b of the transmission/reception loop antenna 14 interpose the excitation loop antenna 12 therebetween. As best shown in FIG. 6, in addition to the first loop 14a and the second loop 14b, the transmission/reception loop antenna 14 further includes a connecting portion 14c connecting the ends 14aa and 14bb of the first loop 14a and the second loop 14b opposite to the ends connected to the resonance capacitor 15, respectively, to each other. Thereby, the coupling coefficient K between the excitation loop antenna 12 and the transmission/reception loop antenna 14 can be maximized. By making the first loop 14a and second loop 14b of the transmission/reception loop antenna 14 symmetric to each other, the antenna properties may be balanced laterally as seen from the excitation loop antenna 12.

The direction of the electric current that flows in each of the loops of the transmission/reception loop antenna 14 is indicated in FIG. 3. Specifically, at the time of signal transmission, the transmission signal is forwarded from the transmission processing unit connecting terminals 13 to the excitation loop antenna 12, and this causes electric current to flow through the excitation loop antenna 12 in the direction indicated by solid line arrow I1. This in turn causes the transmission signal to be transmitted to the transmission/reception loop antenna 14 by magnetic induction so that electric current flows through the transmission/reception loop antenna 14 in the direction indicated by broken line arrow 12. The excitation loop antenna 12 and the transmission/reception loop antenna 14 are thus configured such that the electric current flows through the loops of the transmission/reception loop antenna 14 in opposite direction to that flows through the loop of the excitation loop antenna 12.

Figure 7:
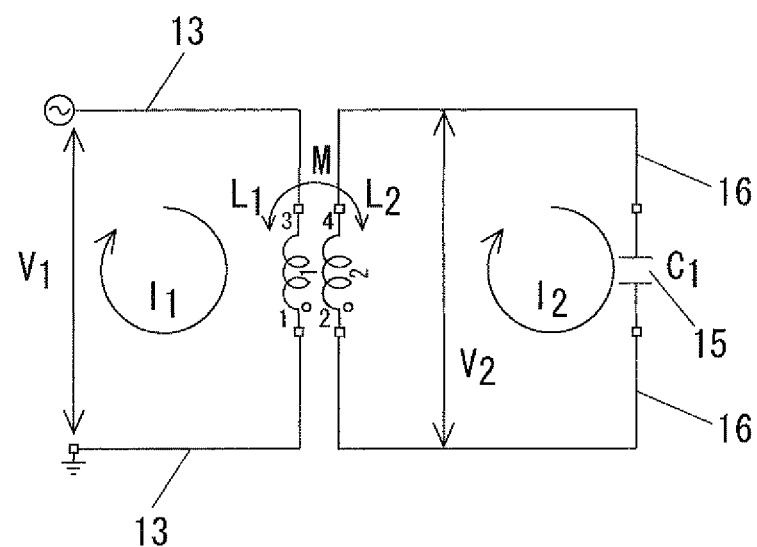
FIG. 7 is an equivalent circuit diagram of the transmission/reception antenna 3 given as a transformer circuit.
Figure 8:
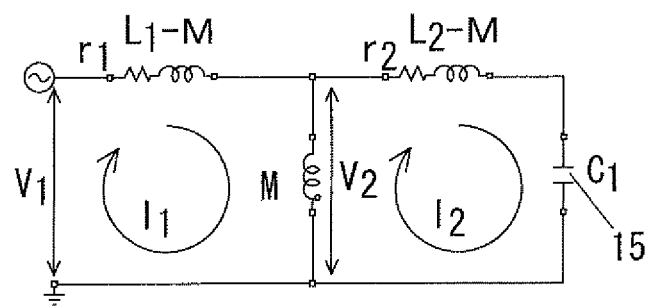
FIG. 8 is an equivalent circuit diagram of the transmission/reception antenna 3 given as a coil circuit.

The property of the transmission/reception antenna 3 is described in the following by using equivalent circuits thereof. FIG. 7 is a circuit diagram showing an equivalent circuit of the transmission/reception antenna 3 as a transformer circuit, and FIG. 8 is a circuit diagram showing an equivalent circuit of the transmission/reception antenna 3 as a coil circuit.

The inductance L1 of the excitation loop antenna 12 and the inductance L2 of the transmission/reception loop antenna 14 are electro-magnetically coupled as represented by a mutual inductance M. The mutual inductance M is related to the inductance L1 and the inductance L2 by the following equation.

$$M = K \times \sqrt{(L1 \times L2)} \tag{Eq. 1}$$

where the coupling coefficient K may take a value as given by $0 \leq K \leq 1$. As can be seen from Eq. 1, the greater the coupling coefficient K is, the greater the mutual inductance M gets.

When a primary current I1 is conducted through the excitation loop antenna 12, the resulting magnetic flux causes an induced voltage V2 across the open ends of the transmission/reception loop antenna 14 owing to the mutual inductance M. As the resonance capacitance 15 (C1) is connected across the open ends of the transmission/reception loop antenna 14, a secondary current I2 flows in the closed circuit consisting of the inductance L2 and the capacitance C1.

Figure 9:
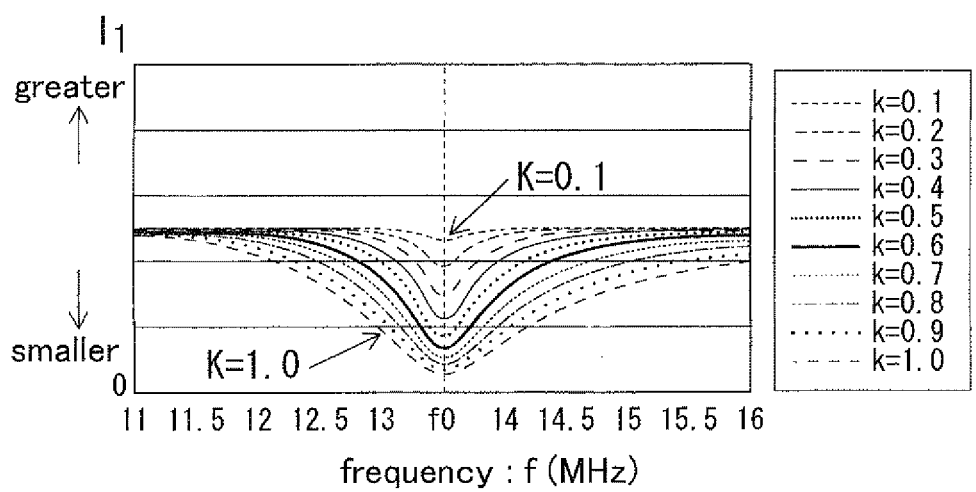
FIG. 9 is a graph showing the frequency properties of the primary current I1 flowing in the excitation loop antenna 12 for different values of the coupling coefficient K between the excitation loop antenna 12 and the transmission/reception loop antenna 14.
Figure 10:
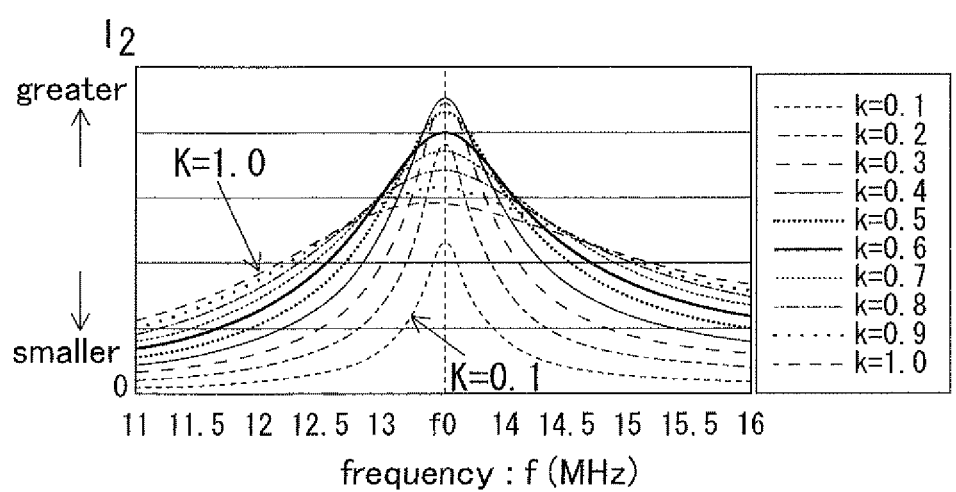
FIG. 10 is a graph showing the frequency properties of the secondary current I2 flowing in the transmission/reception loop antenna 14 for different values of the coupling coefficient K between the excitation loop antenna 12 and the transmission/reception loop antenna 14.

FIG. 9 is a graph showing the frequency properties of the primary current I1 flowing in the excitation loop antenna 12 for different values of the coupling coefficient K between the excitation loop antenna 12 and the transmission/reception loop antenna 14. FIG. 10 is a graph showing the frequency properties of the secondary current I2 flowing in the transmission/reception loop antenna 14 for different values of the coupling coefficient K between the excitation loop antenna 12 and the transmission/reception loop antenna 14.

As can be seen from FIG. 9, the primary current I1 takes a peak value (minimum value) at the resonant frequency f0 (which is 13.56 MHz in this embodiment), and this peak value progressively decreases as the coupling coefficient K is increased from 0.1 to 1.0 over the entire frequency range. In particular, even in regions remote from the resonant frequency f0, the primary current I1 significantly decreases with an increase in the coupling coefficient K.

As can be seen from FIG. 10, the secondary current I2 takes a peak value (maximum value) at the resonant frequency f0 (which is 13.56 MHz in this embodiment), and this peak value and the secondary current value in the adjacent frequency range progressively increases with an increase in the value of the coupling coefficient K from 0.1 to 0.4, but decreases when the coupling coefficient K is increased beyond 0.4. The value of the secondary current I2 in the frequency ranges remote from the resonant frequency f0 generally increases as the value of the coupling coefficient K is increased from 0.1 to 1.0. Therefore, it can be seen that the frequency range has expanded.

The magnetic flux (magnetic field strength) generated by the excitation loop antenna 12 and the transmission/reception loop antenna 14 is described in the following. The magnetic field strength H generated by current I conducted through a coil conductor is related to the inductance L of the coil conductor by the following equation.

$$H \propto L \times I \quad \text{(Eq. 2)}$$

In other words, the magnetic field strength H is proportional to the product of the inductance L and the electric current I flowing through the coil conductor.

Therefore, at frequency f0, the magnetic field strength H1 produced by the primary current I1 conducted through the excitation loop antenna 12 is proportional to the product of the inductance L1 of the excitation loop antenna 12 and the primary current I1. Likewise, the magnetic field strength H2 produced by the secondary current I2 conducted through the transmission/reception loop antenna 14 is proportional to the product of the inductance L2 of the transmission/reception loop antenna 14 and the secondary current I2.

As the primary current I1 conducted through the excitation loop antenna 12 is opposite in direction to the secondary current I2 conducted through the transmission/reception loop antenna 14 as shown in FIG. 3, the magnetic flux produced by the excitation loop antenna 12 is opposite in direction to the magnetic flux produced by the transmission/reception loop antenna 14, and these two magnetic fluxes attenuate each other. The magnetic field strength H of the transmission/reception antenna 3 after taking into consideration this mutual attenuation can be given by subtracting the magnetic field strength H1 of the excitation loop antenna 12 from the magnetic flux H2 of the transmission/reception loop antenna 14. In other words, the magnetic flux generated by the conduction of electric current through the excitation loop antenna 12 reduces the magnetic flux generated by the conduction of electric current through the transmission/reception loop antenna 14.

In the present embodiment, an excessive attenuation of the magnetic flux of the transmission/reception loop antenna 14 is avoided by forming the excitation loop antenna 12 as consisting of a loop 12a of a single turn while the transmission/reception loop antenna 14 is formed as a loop 13a of a plurality of turns. Thereby, an adequate magnetic flux can be produced from the transmission/reception loop antenna 14 without excessively increasing the transmission power from the excitation loop antenna 12, and the power consumption can be controlled.

In the first embodiment, the number of turns of the transmission/reception loop antenna 14 can be selected appropriately provided that the inductance L1 of the excitation loop antenna 12 and the inductance L2 of the transmission/reception loop antenna 14 satisfy the condition that L2≥10×L1.

Figure 11:
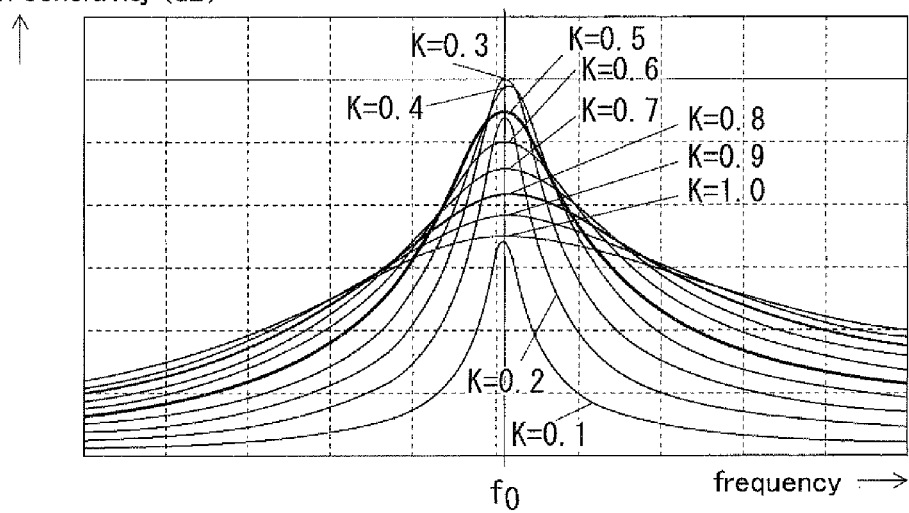
FIG. 11 is a graph showing the frequency properties of the transmission output and the reception sensitivity for different values of the coupling coefficient K between the excitation loop antenna 12 and the transmission/reception loop antenna 14.
Figure 12:
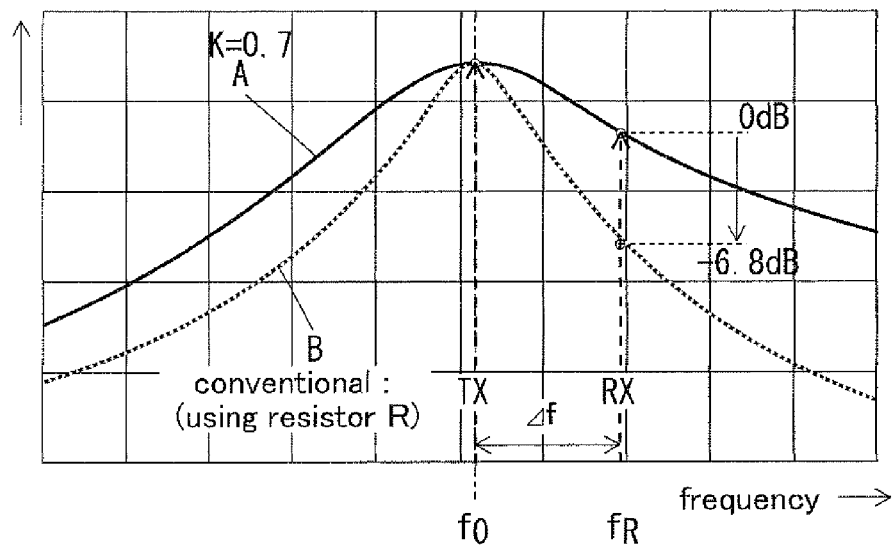
FIG. 12 shows the frequency property of the present invention when the coupling coefficient K=0.7, and the frequency property of a conventional arrangement using a resistor for expanding the frequency range.

FIG. 11 shows the frequency properties of the transmission output and the reception sensitivity for different values of the coupling coefficient K between the excitation loop antenna 12 and the transmission/reception loop antenna 14. Here, the transmission output and the reception sensitivity are substantially equal to the value obtained by multiplying the inductance L2 of the transmission/reception loop antenna 14 to the secondary current I2 having the property as given in FIG. 10. FIG. 12 shows the frequency property of the present embodiment when the coupling coefficient K=0.7, and the frequency property of a conventional arrangement using a resistor for expanding the frequency range.

As can be seen by comparing the present embodiment indicated by line A with the conventional arrangement indicated by line B in FIG. 12, the transmission output and reception sensitivity of the present embodiment are higher than those of the conventional arrangement, and demonstrates a broader frequency property than the conventional arrangement. In the first embodiment, by appropriately selecting the coupling coefficient K between the excitation loop antenna 12 and the transmission/reception loop antenna 14, the frequency property may be expanded, and the power consumption can be reduced as compared with the conventional arrangement because a resistor is not provided in the transmission/reception path of the transmission/reception antenna as opposed to the conventional arrangement.

Figure 13:
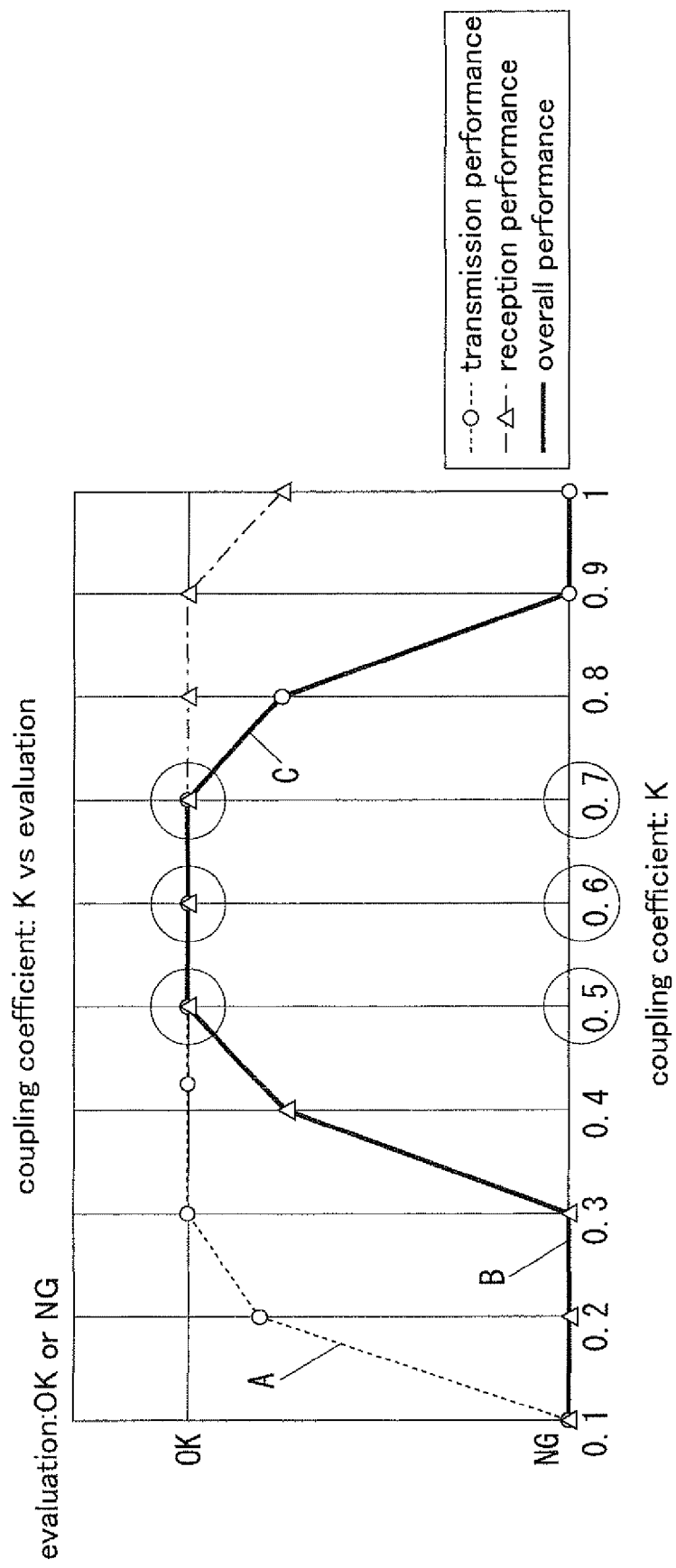
FIG. 13 is a diagram illustrating a method of evaluating the communication performance for different values of the coupling coefficient K between the excitation loop antenna 12 and the transmission/reception loop antenna 14.

The optimum value of the coupling coefficient K between the excitation loop antenna 12 and the transmission/reception loop antenna 14 is discussed in the following. FIG. 13 is a diagram illustrating a method of evaluating the communication performance for different values of the coupling coefficient K between the excitation loop antenna 12 and the transmission/reception loop antenna 14. In this diagram, by using the coupling coefficient K as a parameter, the transmission performance in transmitting a signal to the wireless communication medium 1 is indicated by line A, the reception performance in receiving a response signal from the wireless communication medium 1 is indicated by line B, and the overall performance combining both the transmission performance and the reception performance is indicated by line C.

The transmission performance (line A) is generally favorable in the range where the coupling coefficient K=0.3-0.7, and the reception performance (line B) is generally favorable in the range where the coupling coefficient K=0.5-0.9. Therefore, the overall performance that takes into account both the transmission performance and the reception performance is optimized in the range where the coupling coefficient K=0.5-0.7. In the first embodiment, as the coupling coefficient K is approximately 0.7, a favorable communication performance can be achieved.

Figure 14:
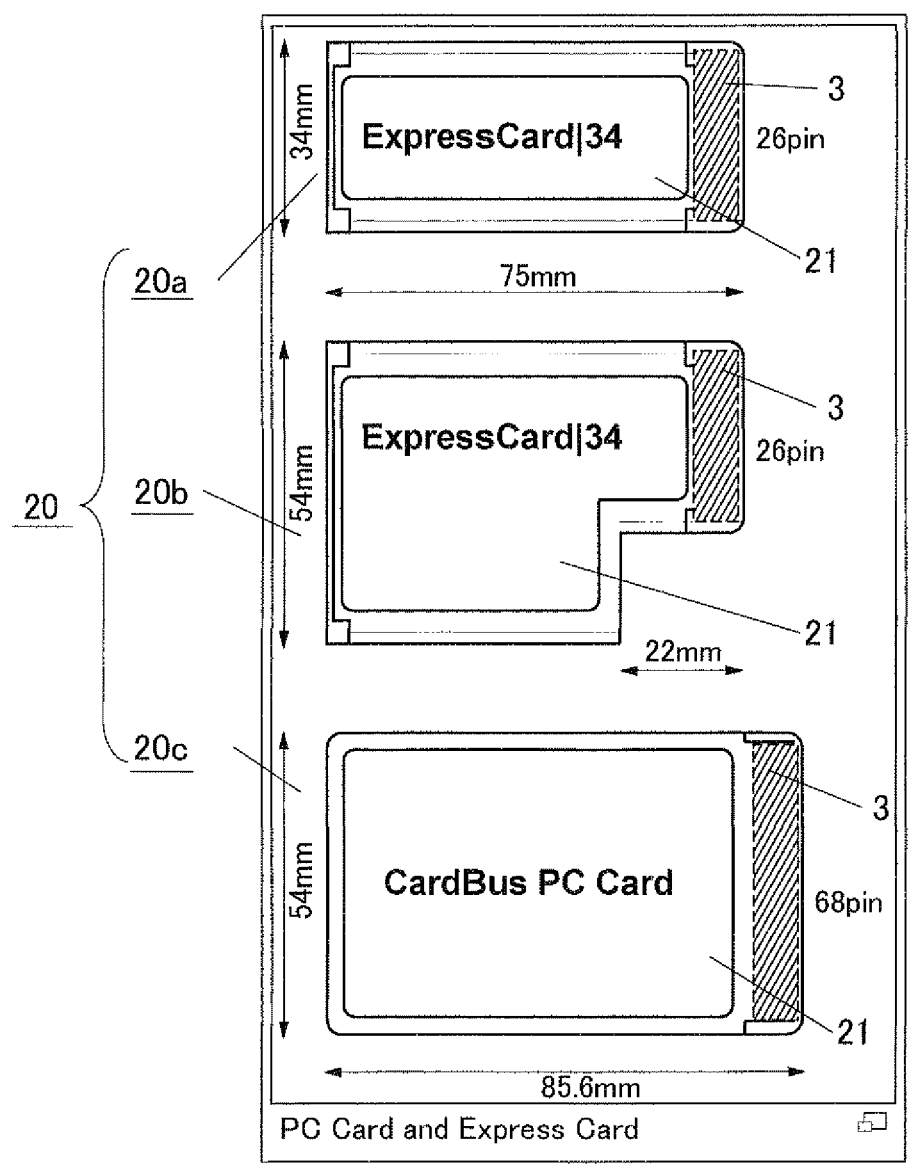
FIG. 14 is a plan view showing how the transmission/reception antenna is incorporated in ExpressCards of three different sizes.

Such a transmission/reception antenna 3 (see FIG. 1, for instance) can be incorporated in an ExpressCard configured to be inserted in a card slot of a personal computer (PC). FIG. 14 is a plan view showing ExpressCards incorporated with a transmission/reception antenna 3 according to the first embodiment. The ExpressCard 20 is available in three types, ExpressCard 20a, 20b and 20c, having different dimensions, but all of them are no more than about 5 mm thick.

The planar transmission/reception antenna 3 of the present invention can be received even in such a thin housing. The transmission/reception antenna 3, without regard to the type thereof, can be incorporated in a part of the ExpressCard which remains exposed outside the personal computer when the ExpressCard is inserted in the card slot of the personal computer. In this case, the function of the control unit shown in FIG. 1 is performed by the personal computer, and the control unit 8, reception processing unit 9, transmission processing unit 10 and filter circuits 9a and 10a are received in an unexposed part of the ExpressCard which is concealed in the card slot of the personal computer when the ExpressCard is inserted in the card slot of the personal computer. In the configurations of the ExpressCard 20 shown in FIG. 14, the personal computer having the ExpressCard 20 inserted in the card slot thereof performs the functions of the control device 6 and reader/writer device 7 shown in FIG. 1.

As discussed above, in the first embodiment, owing to the foregoing structure, by selecting a relatively large value for the coupling coefficient K between the excitation loop antenna 12 and the transmission/reception loop antenna 14, and conducting a relatively large current through the transmission/reception loop antenna 14, the frequency property can be expanded.

Also, as the transmission/reception antenna 3 is formed by winding the excitation loop antenna 12 and the transmission/reception loop antenna 14 on the planar magnetic member 11, the transmission/reception antenna 3 can be produced as a highly thin component.

In the first embodiment, as the transmission/reception loop antenna 14 includes a first loop including a plurality of turns, a second loop also including a plurality of turns, and a connecting portion connecting the ends of the first loop and the second loop opposite to the ends connected to the resonance capacitor, respectively, with each other, and the first loop 14a and the second loop 14b of the transmission/reception loop antenna 14 are located on either side of the excitation loop antenna 12 so that even when the size of the magnetic member 11 is limited, the sizes and shapes of the excitation loop antenna 12 and the transmission/reception loop antenna 14, as well as the coupling coefficient K between them, can be selected as appropriate values with a high level of freedom, and the broadening of the frequency property and the reduction in the power consumption can be achieved at the same time.

In the first embodiment, as the magnetic member 11 is located inside the loops of the excitation loop antenna 12 and the transmission/reception loop antenna 14, and the first loop 14a and the second loop 14b of the transmission/reception loop antenna 14 are located on either side of the excitation loop antenna 12, the distance between the transmission/reception loop antenna 4 of the wireless communication medium 1 and the transmission/reception loop antenna 14 can be minimized, and the transmission efficiency can be thereby improved.

Figure 15:
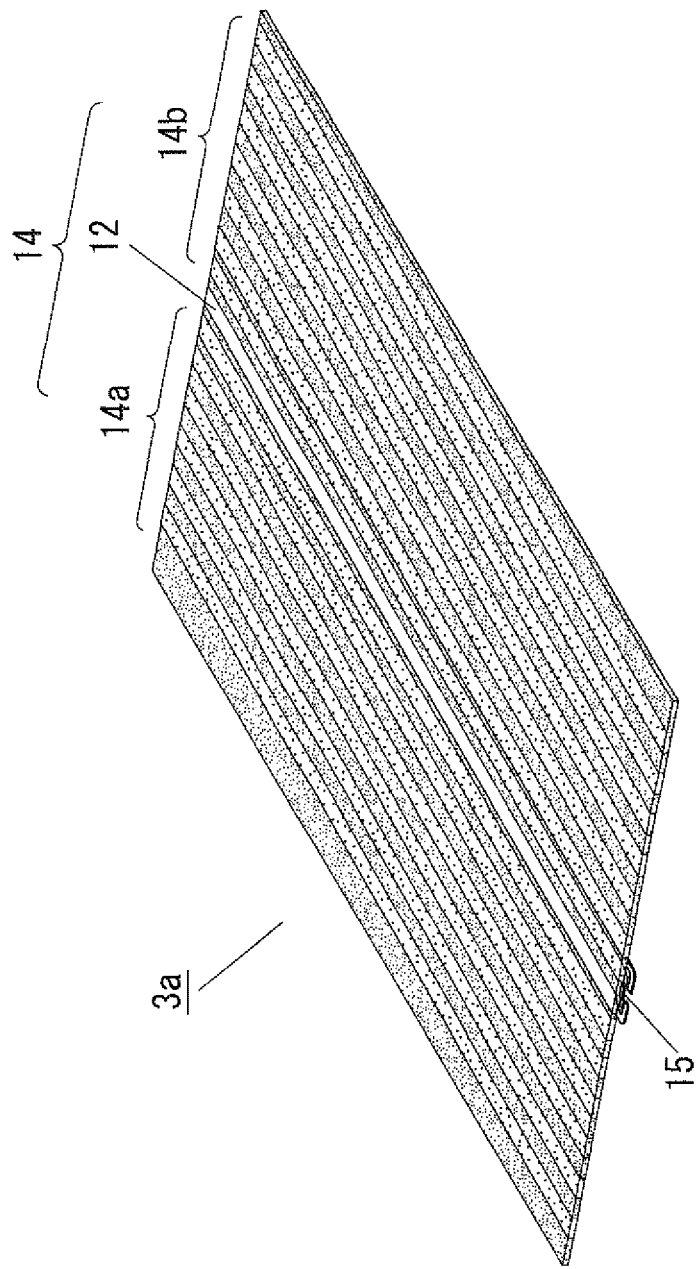
FIG. 15 is a perspective view showing a modification of the transmission/reception antenna of the first embodiment.

In the transmission/reception antenna 3 illustrated in FIGS. 1 to 14, the magnetic member 11 is elongated in the direction perpendicular to the cross section of each loop of the excitation loop antenna 12 and the transmission/reception loop antenna 14. However, the transmission/reception antenna of the first embodiment is not limited by this configuration. FIG. 15 is a perspective view of a modification of the first embodiment. In the transmission/reception antenna 3a illustrated in FIG. 15, the magnetic member 11 is elongated in the direction parallel to the cross section of each loop of the excitation loop antenna 12 and the transmission/reception loop antenna 14. In short, it is important that the magnetic member 11 is wrapped inside the loop of each of the excitation loop antenna 12 and the transmission/reception loop antenna 14, that the excitation loop antenna 12 includes a loop of a single turn, that the transmission/reception loop antenna 14 includes a first loop 14a including a plurality of turns, a second loop 14b also including a plurality of turns, and a connecting portion 14c connecting the ends of the first loop 14a and the second loop 14b opposite to the ends connected to the resonance capacitor 15, respectively, with each other and that the first loop 14a and the second loop 14b of the transmission/reception loop antenna 14 are located on either side of the excitation loop antenna 12.

In the first embodiment, the magnetic member 11 consisted of a planar sheet member. However, it may also be shaped as a cylindrical member having a circular, elliptic, rectangular or any other polygonal cross section for the antenna for this modified embodiment to provide similar functions as those of the antenna of the first embodiment.

Embodiment 2

A transmission/reception antenna of a transmission/reception device according to a second embodiment of the present invention is described in the following with reference to FIGS. 16 to 18.

Figure 16:
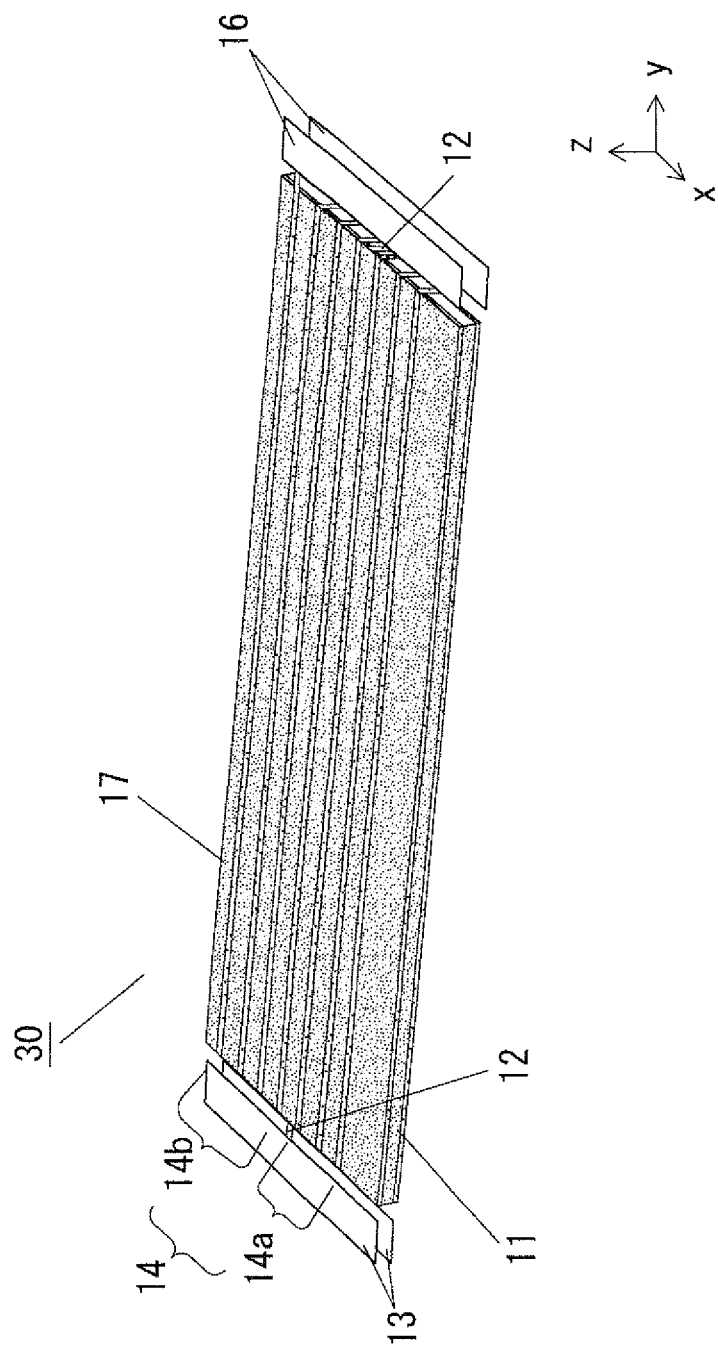
FIG. 16 is a perspective view showing a transmission/reception antenna of a transmission/reception device according to a second embodiment of the present invention.
Figure 17:
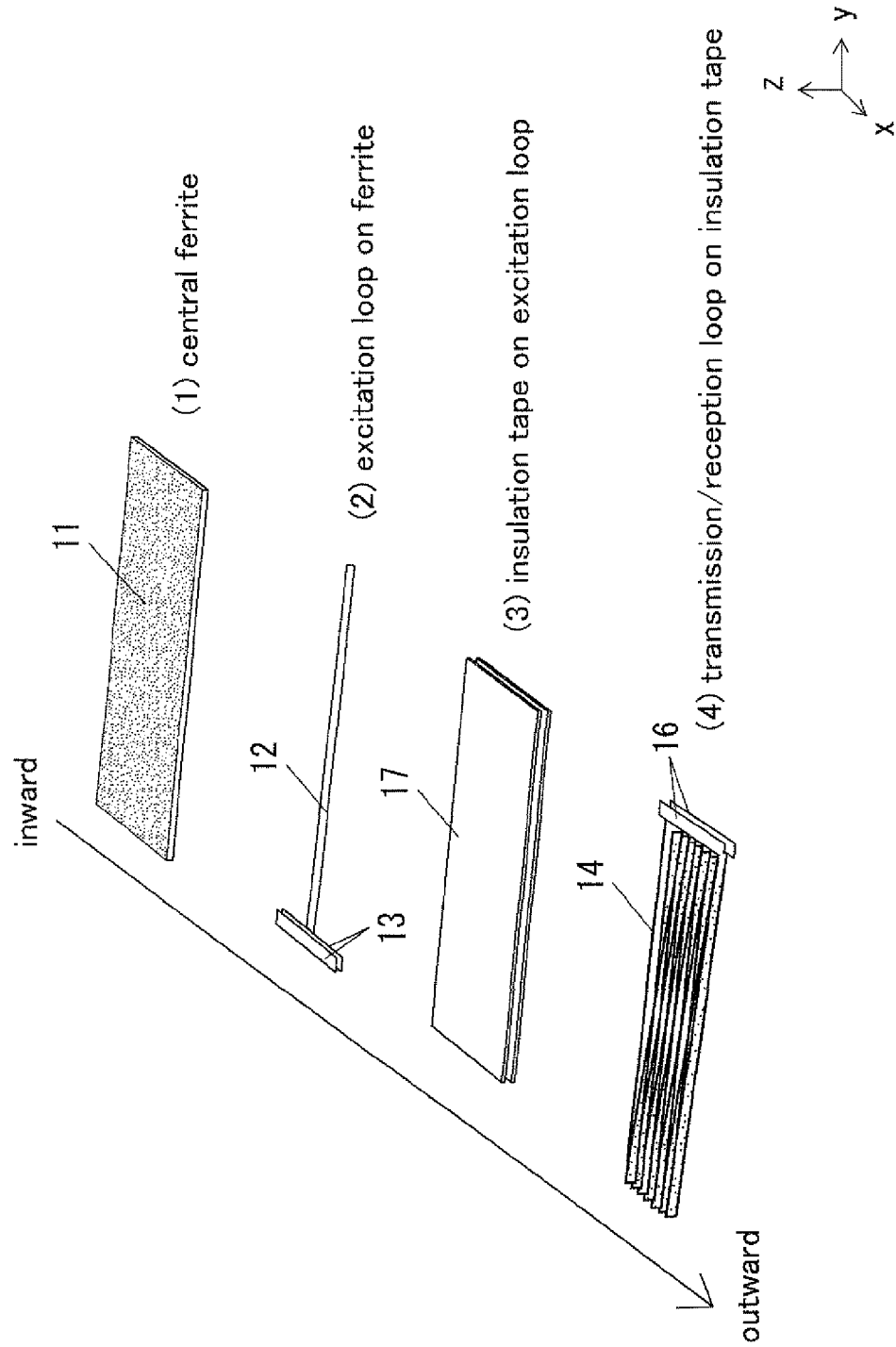
FIG. 17 is an exploded perspective view of the transmission/reception antenna 30 of the second embodiment.

FIG. 16 is a perspective view showing a transmission/reception antenna of a transmission/reception device according to the second embodiment of the present invention, and FIG. 17 is an exploded perspective view of the transmission/reception antenna 30 shown in FIG. 16. FIG. 18 is a diagram showing the relationship between the excitation loop antenna 12 and the transmission/reception loop antenna 14. The second embodiment is also constructed as a contactless smart card which is similar to that of the first embodiment represented by the block diagram of FIG. 1 except for that the transmission/reception antenna of the first embodiment is replaced by the transmission/reception antenna 30 of the second embodiment. Therefore, the block diagram of the second embodiment and the detailed description thereof are omitted in the following disclosure. The resonance capacitor 15 connected to the transmission/reception antenna in FIG. 1 is also used in the second embodiment, but is shown only by dotted lines in FIG. 18, and omitted from illustration in FIGS. 16 and 17. However, it should be noted that the second embodiment is no different from the first embodiment in having the resonance capacitor 15 connected to the reception processing unit connecting terminals 16 forming the two ends of the transmission/reception loop antenna 14. In FIG. 18, the magnetic member 11 and an insulation tape 17 (which will be described hereinafter) are omitted from illustration.

The transmission/reception antenna 30 of the second embodiment shown in FIG. 16 is similar in most part to the transmission/reception antenna 3 of the first embodiment shown in FIGS. 1 to 6. Therefore, in the description of the second embodiment, the parts corresponding to those of the first embodiment shown in FIGS. 1 to 6 are denoted with like numerals in FIGS. 16 to 18. However, there are two major differences between the transmission/reception antenna 30 of the second embodiment and the transmission/reception antenna 3 of the first embodiment.

Firstly, these two antennas differ from each other in shape. In the transmission/reception antenna 3 shown in FIG. 1, the magnetic member (magnetic base board) 11 is elongated in the direction substantially perpendicular to the cross section of each loop of the excitation loop antenna 12 and the transmission/reception loop antenna 14. On the other hand, in the transmission/reception antenna 30 shown in FIG. 16, the magnetic member 11 is elongated in the direction substantially parallel to the cross section of each loop of the excitation loop antenna 12 and the transmission/reception loop antenna 14.

Figure 18:
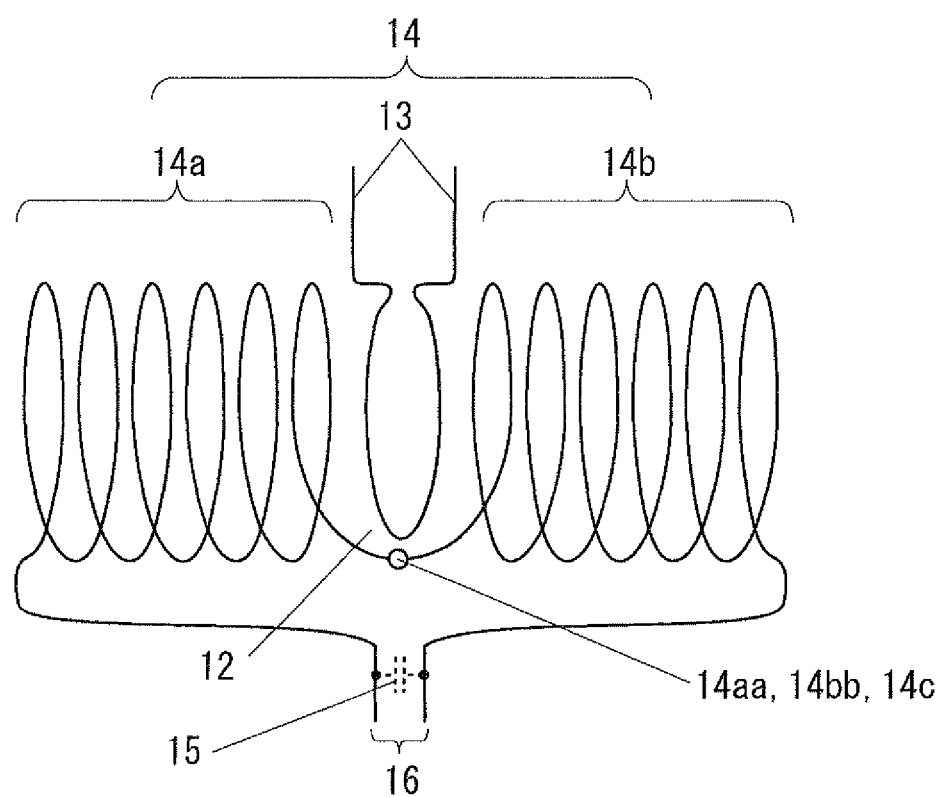
FIG. 18 is a diagram showing the relationship between the excitation loop antenna 12 and the transmission/reception loop antenna 14 included in the transmission/reception antenna 30.

The relationship between the excitation loop antenna 12 and the transmission/reception loop antenna 14 of the second embodiment illustrated in FIG. 18 differs from the relationship between the excitation loop antenna 12 and the transmission/reception loop antenna 14 of the first embodiment illustrated in FIG. 6. More specifically, the ends 14aa and 14bb of the first loop 14a and the second loop 14b of the transmission/reception loop antenna 14 opposite to the ends connected to the resonance capacitor 15, respectively, and the connecting portion 14c connecting these two points to each other consist of a single common point.

Furthermore, the transmission processing unit connecting terminals 13 forming the two ends of the excitation loop antenna 12 and the reception processing unit connecting terminals 16 forming the two ends of the transmission/reception loop antenna 14 are provided on opposite ends (two lengthwise ends) of the magnetic member 11 or the opposite ends (two lengthwise ends) of the insulating tape 17. This arrangement enables the thickness of the transmission/reception antenna 30 to be minimized, and the spacing between the transmission unit 10 and the reception unit 9 (see FIG. 1) and hence the interference that could be caused between them to be minimized.

These differences are not fundamental according to the broad concept of the present invention. The two embodiments share the common feature that the magnetic member 11 is placed inside each loop of the excitation loop antenna 12 and the transmission/reception loop antenna 14, that the excitation loop antenna 12 includes a loop of a single turn, that the transmission/reception loop antenna 14 includes a first loop 14a of multiple turns, a second loop 14b of multiple turns and a connecting portion 14c connecting the ends of the first and second loops 14a and 14b opposite to the ends thereof connected to a resonance capacitor 15, and that the first and second loops 14a and 14b are located on either side of the excitation loop antenna 12.

Another difference may be found in that the excitation loop antenna 12 is directly adjacent to the magnetic member 11, and the transmission/reception loop antenna 14 is disposed on or around the excitation loop antenna 12 via the insulating tape 17.

As shown in FIG. 17, in the transmission/reception loop antenna 14, the first and second loops 14a and 14b disposed on either side of the excitation loop antenna 12 are formed from a single continuous coil, and there is no boundary between them. However, as shown in FIG. 16, once the excitation loop antenna 12 is placed centrally on the transmission/reception loop antenna 14 via the insulating tape 17, the first and second loops 14a and 14b of the transmission/reception loop antenna 14 are defined on either side of the excitation loop antenna 12. This is also the reason why the ends 14aa and 14bb of the first loop 14a and the second loop 14b of the transmission/reception loop antenna 14 opposite to the ends connected to the resonance capacitor 15, respectively, and the connecting portion 14c connecting these two points to each other consist of a single common point.

The use of the insulating tape 17 provides the following advantages.

There may be a need to change the spacing between the loops of the excitation loop antenna 12 and the transmission/reception loop antenna 14, and/or the number of turns of the transmission/reception loop antenna 14. In the case of the transmission/reception antenna 3 of the first embodiment illustrated in FIGS. 1 to 6, as the excitation loop antenna 12 and the transmission/reception loop antenna 14 are located on a same plane, if any change is made in the specification of either of the antennas 12 and 14, the entire design of the two antennas is affected. However, in the case of the transmission/reception antenna 30 of the second embodiment illustrated in FIG. 16, the excitation loop antenna 12 and the transmission/reception loop antenna 14 can be designed individually, and a change in one of the antennas 12 and 14 does not affect the other.

As the excitation loop antenna 12 and the transmission/reception loop antenna 14 are completely separated by the insulating tape 17, the short-circuiting between the excitation loop antenna 12 and the transmission/reception loop antenna 14 can be avoided without requiring any high positional precision. As the excitation loop antenna 12 and the transmission/reception loop antenna 14 are layered one over the other, the number of turns of the transmission/reception loop antenna 14 can be increased to a significant extent in the limited available space. In particular when the magnetic member 11 is elongated in the direction substantially in parallel to the cross section of each loop of the excitation loop antenna 12 and the transmission/reception loop antenna 14, it is relatively difficult to achieve a large number of turns although the number of turns may be critical in achieving a desired reception sensitivity. This embodiment allows the desired reception sensitivity to be achieved simply by increasing the number of turns of the transmission/reception loop antenna 14.

In the second embodiment, the excitation loop antenna 12 is directly adjacent to the magnetic member 11, and the transmission/reception loop antenna 14 is disposed on or around the excitation loop antenna 12 via the insulating tape 17. Alternatively, it is also possible to arrange the two antennas in such a manner that the transmission/reception loop antenna 14 is directly adjacent to the magnetic member 11, and the excitation loop antenna 12 is disposed on or around the transmission/reception loop antenna 14 via the insulating tape 17.

In the transmission/reception antenna 30 of the second embodiment, the magnetic member 11 is placed inside each loop of the excitation loop antenna 12 and the transmission/reception loop antenna 14, and the first and second loops 14a and 14b of the transmission/reception loop antenna 14 are placed on either side the excitation loop antenna 12 so that the distance between the transmission/reception loop antenna 4 of the wireless communication medium 1 and the transmission/reception loop antenna 14 can be reduced, and the communication efficiency can be improved.

In the second embodiment, the magnetic member 11 consisted of a planar sheet member. However, it may also be shaped as a cylindrical member having a circular, elliptic, rectangular or any other polygonal cross section for the antenna for this modified embodiment to provide similar functions as those of the antenna of the first embodiment.

Embodiment 3

A transmission/reception antenna for a transmission/reception device according to a third embodiment of the present invention is described in the following with reference to FIGS. 19 to 26.

Figure 19:
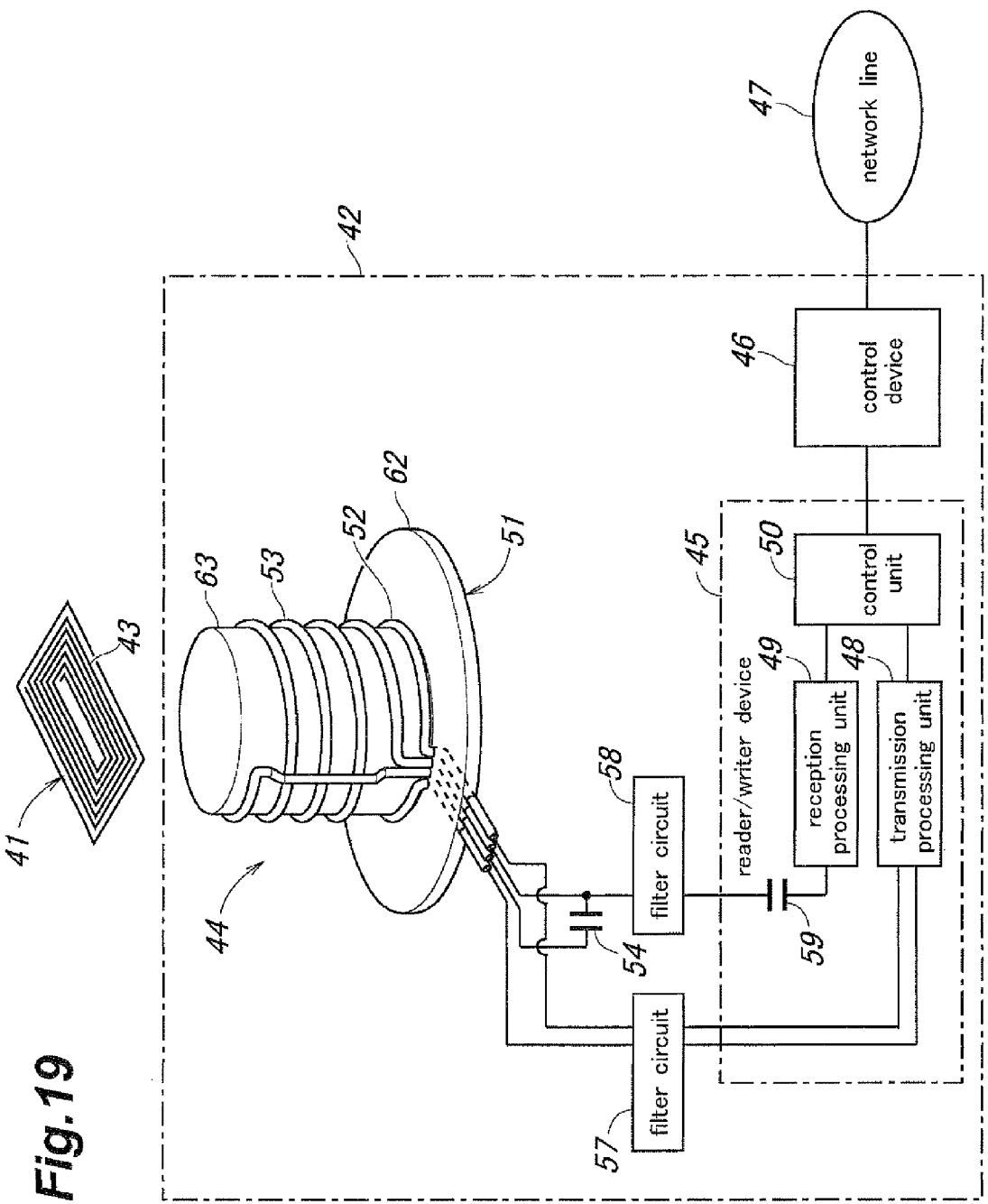
FIG. 19 is a block diagram showing a transmission/reception system incorporated with a transmission/reception device according to a third embodiment of the present invention.

FIG. 19 is a diagram illustrating the overall structure of a transmission/reception system incorporated with the transmission/reception device of the third embodiment. This transmission/reception system is configured to be applied to supply chain and logistics systems, traffic systems, inventory management systems, book management systems, personal verification systems, electronic money systems and so on, and comprises a transmission/reception device 42 for supplying electric power to a wireless communication medium 41, and exchanging signals with the wireless communication medium 41.

The wireless communication medium 41 may consist of a RFID tag attached to a piece of merchandise or a book, or a contactless smart card for personal verification or the like, and is not described in detail because it is per se known. The wireless communication medium 41 essentially consists of a transmission/reception loop antenna 43 and a control IC (not shown in the drawings), and is configured to communicate with the transmission/reception device 42 by using a frequency band of 13.56 MHz, for instance.

The transmission/reception, device 42 includes a transmission/reception antenna 44, a reader/writer device 45 and a control device 46 connected to the reader/writer device 45, and the control device 46 is connected to a network line 47. The reader/writer device 45 includes a transmission processing unit 48 for forwarding a transmission signal to the transmission/reception antenna 44, a reception processing unit 49 for receiving a transmission signal from the transmission/reception antenna 44 and a control unit 50 for controlling the transmission processing unit 48 and the reception processing unit 49, and the control unit 50 is connected to the control device 46.

The transmission/reception antenna 44 comprises a magnetic member 51, an excitation loop antenna 52 and a transmission/reception loop antenna 53 which are placed adjacent to and not in contact with the magnetic member 51, and a resonance capacitor 54 connected to the two ends of the transmission/reception loop antenna 53.

The excitation loop antenna 52 is connected to the transmission processing unit 48 of the reader/writer device 45 via a filter circuit 57, and the transmission/reception loop antenna 53 is connected to the reception processing unit 49 of the reader/writer device 45 via a filter circuit 58

In the transmission/reception device 42, the a coupling capacitor 59 is provided on a reception signal path for forwarding the signal received by the transmission/reception loop antenna 53 to the reception processing unit 49. In particular, the coupling capacitor 59 is connected between the filter circuit 58 and the reception processing unit 49.

In the transmission/reception device 42, the transmission signal from the transmission processing unit 48 is fed to the excitation loop antenna 52 via the filter circuit 57, and owing to the magnetic induction by the electric current conducted through the excitation loop antenna 52, the transmission signal is transmitted from the excitation loop antenna 52 to the transmission/reception loop antenna 53, and the transmission signal from the transmission/reception loop antenna 53 is then transmitted to the wireless communication medium 41. The wireless communication medium 41 receives the transmission signal from the transmission/reception loop antenna 53, and this allows the reception of the transmission signal and the supply of electric power to be effected.

The transmission signal from the wireless communication medium 41 is received by the transmission/reception loop antenna 53, and the reception signal is forwarded to the reception processing unit 49 via the filter circuit 58 and the coupling capacitor 59.

Figure 20:
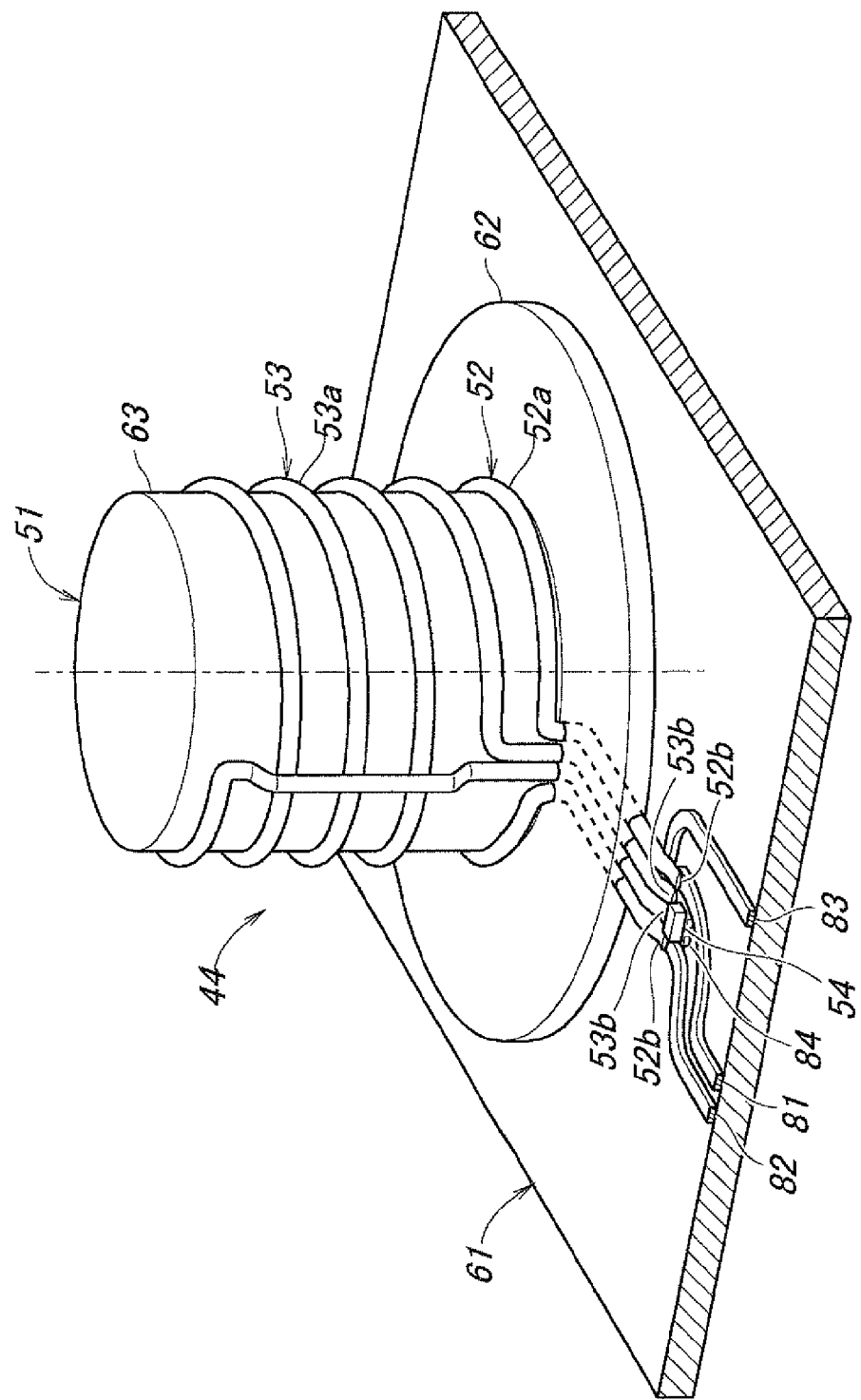
FIG. 20 is a perspective view showing the transmission/reception antenna 44 for the transmission/reception device according to the third embodiment of the present invention.

FIG. 20 is a perspective view showing the transmission/reception antenna 44. The magnetic member 51 forming the transmission/reception antenna 44 includes a base portion 62 fixedly attached to a base board 61 and a columnar portion 63 producing from the base portion 62 perpendicular to the major plane of the base board 61. The base portion 62 is formed as a circular disk and the columnar portion 63 is formed as a cylindrical member extending coaxially from the base portion 62 and having an outer diameter substantially smaller than that of the base portion 62.

The excitation loop antenna 52 includes a circular loop 52a of a single turn, and the transmission/reception loop antenna 53 includes a cylindrical (helical) loop 53a of a plurality (four, in this case) of turns, and the excitation loop antenna 52 and the transmission/reception loop antenna 53 are coaxially wound around the outer circumferential surface of the cylindrical portion 63 of the magnetic member 51.

The excitation loop antenna 52 is wound around a part of the columnar portion 63 adjacent to the base portion 62, and the transmission/reception loop antenna 53 is wound around a part of the columnar portion 63 comparatively remote from the base portion 62. Thereby, the transmission of a signal by the transmission/reception loop antenna 53, and the reception of a signal from the wireless communication medium 41 can be achieved in an efficient manner.

The base portion 62 of the magnetic member 51 is larger in diameter than the excitation loop antenna 52 and the transmission/reception loop antenna 53 so that the transmission/reception antenna 44 is effectively protected from the interferences from the components mounted on the base board 61, in particular the components mounted on the side of the base board 61 facing away from the magnetic member 51.

Figure 21:
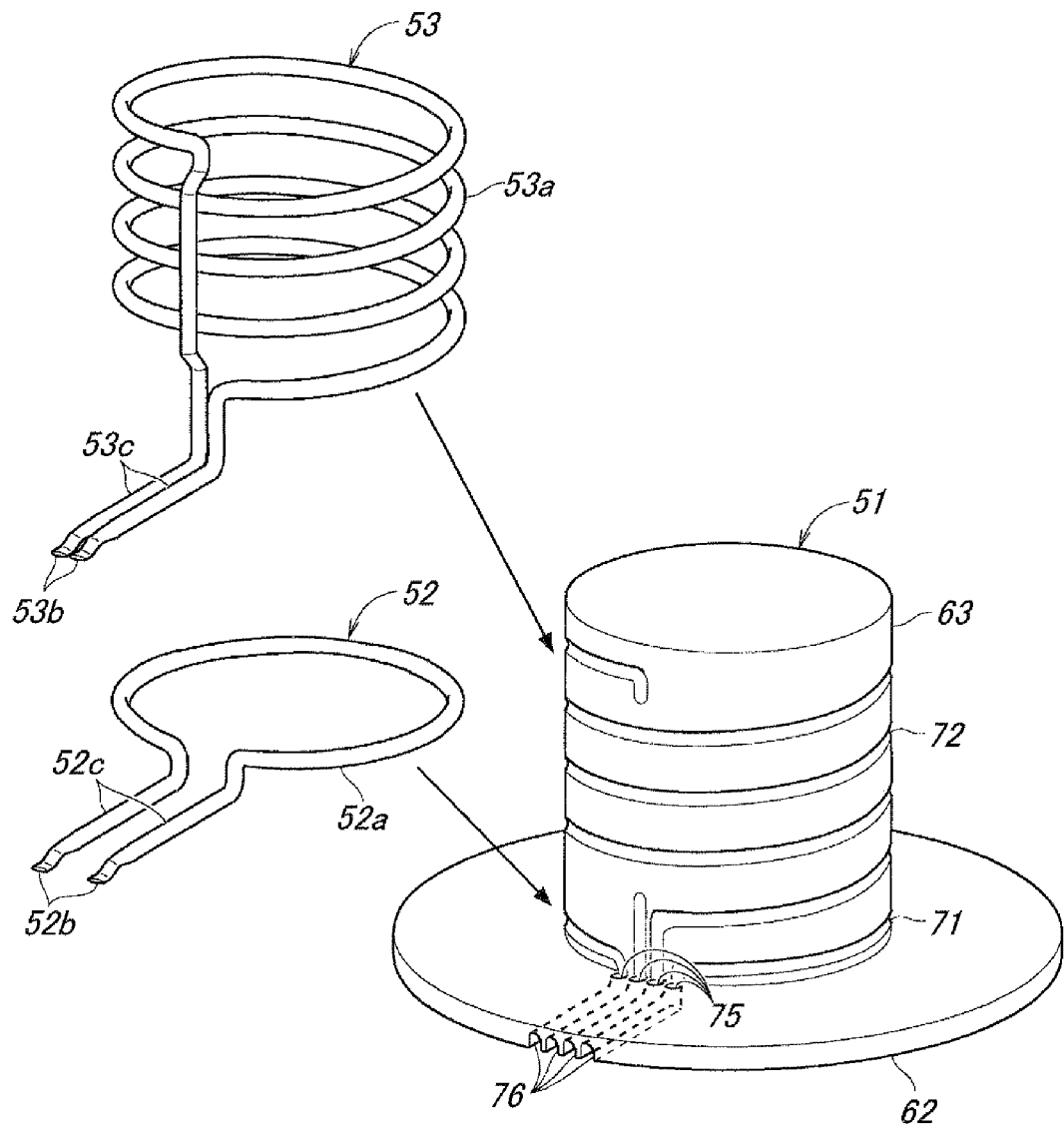
FIG. 21 is an exploded perspective view of the transmission/reception antenna 44.

FIG. 21 is an exploded perspective view of the transmission/reception antenna 44. The columnar portion 63 of the magnetic member 51 is provided with grooves 71 and 72 for partly receiving the loop 52a of the excitation loop antenna 52 and the loop 53a of the transmission/reception loop antenna 53 so that the loop 52a of the excitation loop antenna 52 and the loop 53a of the transmission/reception loop antenna 53 can be accurately positioned.

The excitation loop antenna 52 and the transmission/reception loop antenna 53 are provided with terminal ends (connecting terminals) 52b and 53b that are passed along the back side of the base portion 62 of the magnetic member 51 to the outer peripheral part of the base portion 62. More specifically, the base portion 62 of the magnetic member 51 is formed with four axial holes 75 in a part of the base portion 62 immediately adjacent to the base end of the columnar portion 63 for passing lead wires 52c and 53c of the excitation loop antenna 52 and the transmission/reception loop antenna 53 to the back side of the base portion 62, and the back side of the base portion 62 of the magnetic member 51 is formed with four parallel grooves 76 extending from the four axial holes 75 to the outer periphery of the base portion 62 for receiving the lead wires 52c and 53c of the excitation loop antenna 52 and the transmission/reception loop antenna 53. Thereby, the lead wires 52c and 53c of the excitation loop antenna 52 and the transmission/reception loop antenna 53 are accurately positioned. The parts of the lead wires 52c and 53c protruding from the outer periphery of the base portion 62 form the terminal ends (connecting terminals) 52b and 53b of the excitation loop antenna 52 and the transmission/reception loop antenna 53, respectively.

With the excitation loop antenna 52 and the transmission/reception loop antenna 53 wound around the columnar portion 63 of the magnetic member 51, the magnetic member 51 is fixedly attached to the base board 61 by using a bonding agent or a double-sided tape. See FIG. 20.

Figure 22:
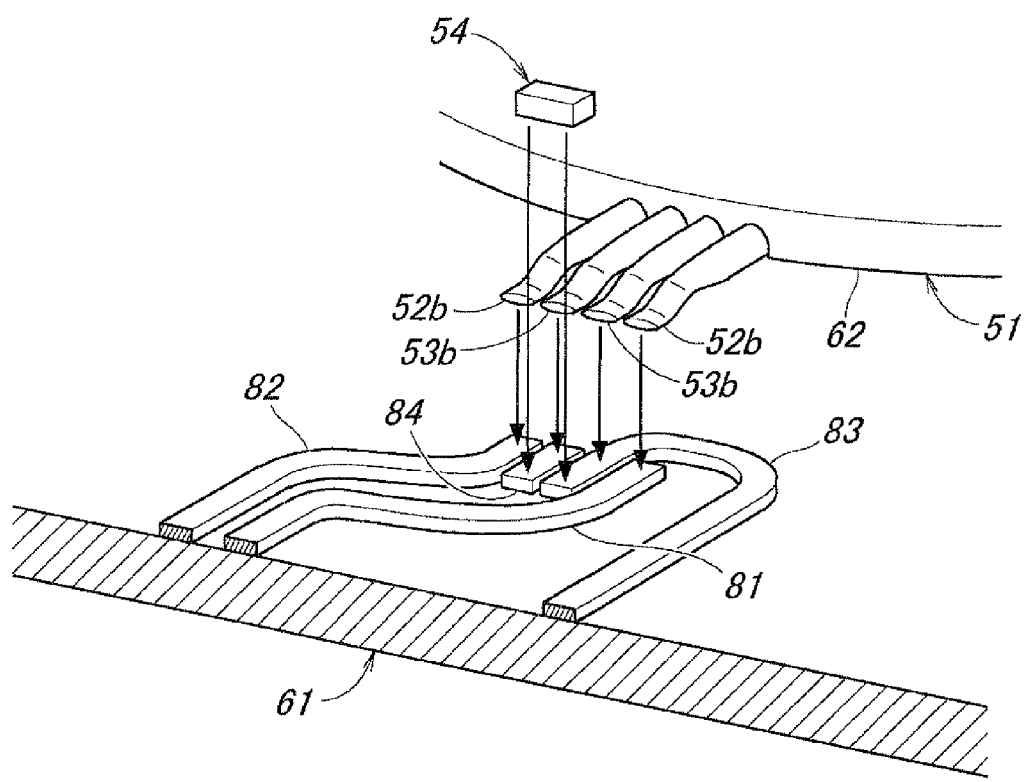
FIG. 22 is an enlarged fragmentary perspective view of the base board 21 of the transmission/reception device.

FIG. 22 is an enlarged fragmentary perspective view of the base board 61. The base board 61 is formed with a four copper foil patterns 81 to 84 to which the respective terminal ends 52b and 53b of the excitation loop antenna 52 and the transmission/reception loop antenna 53 are connected. Two of the copper foil patterns 81 and 82 connected to the terminal ends 52b of the excitation loop antenna 52 extend away from the base portion 62 of the magnetic member 51, and the filter circuit 57 (FIG. 19) mounted on the base board 61 is electrically connected to these copper foil patterns 81 and 82.

The terminal ends 53b of the transmission/reception loop antenna 53 are connected to the remaining two copper foil patterns 83 and 84. One of these two copper foil patterns 83 extends toward the base portion 62 of the magnetic member 51 and after being bent in the shape of letter U, extends away from the base portion 62 of the magnetic member 51. The filter circuit 58 (see FIG. 19) mounted on the base board 61 is connected to the radially outer end of this copper foil pattern 83

Figure 23:
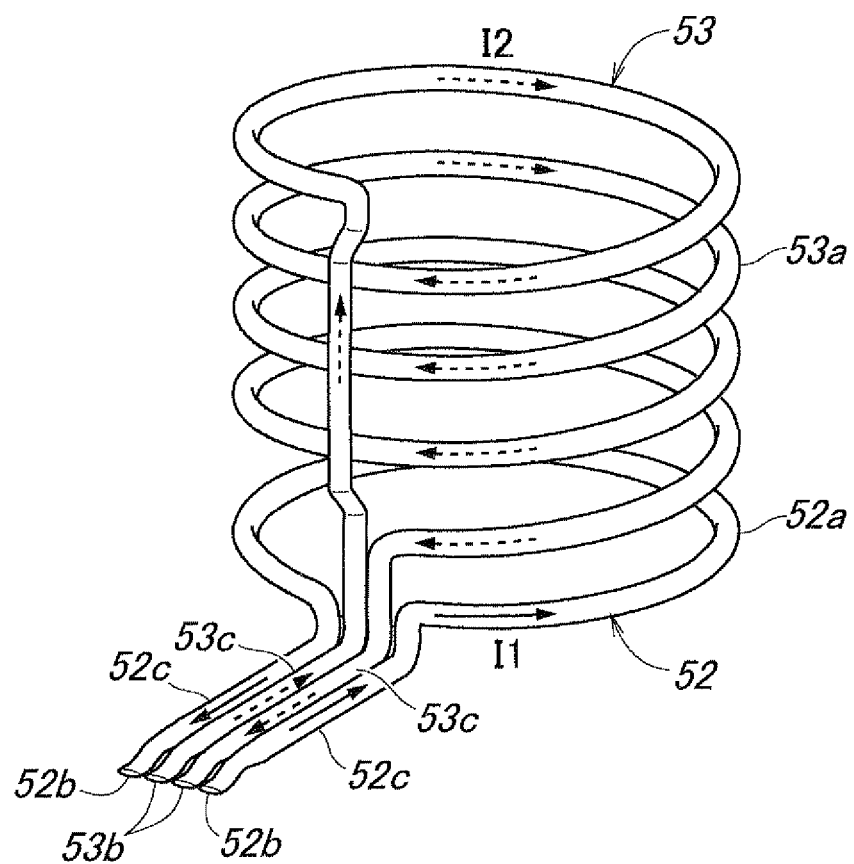
FIG. 23 is a perspective view of the excitation loop antenna 52 and the transmission/reception loop antenna 53 of the transmission/reception antenna 44 showing the direction of electric current in each loop at the time of transmitting a signal.

FIG. 23 is a perspective view showing the flow of electric current in the excitation loop antenna 52 and the transmission/reception loop antenna 53 when transmitting a signal. When a transmission signal is fed to the terminal end (connecting terminal) 52b of the excitation loop antenna 52, electric current I1 as indicated by the solid line arrows is conducted through the excitation loop antenna 52. Owing to the magnetic induction, this causes electric current I2 to be conducted through the transmission/reception loop antenna 53, which is opposite in direction to the electric current I1 of the excitation loop antenna 52, so that the amplified transmission signal is transmitted from the transmission/reception loop antenna 53.

The discussion made on the first embodiment with reference to FIGS. 7 to 13 equally applies to the third embodiment so that the same discussion on the third embodiment is omitted in this disclosure. The number of turns of the transmission/reception loop antenna 53 was four in the third embodiment, but the present invention is not limited by this example, and the transmission/reception loop antenna 53 may have a different number of turns as desired. In the third embodiment, the number of turns of the transmission/reception loop antenna 53 can be selected appropriately provided that the inductance L1 of the excitation loop antenna 52 and the inductance L2 of the transmission/reception loop antenna 53 satisfy the condition that L2≥10×L1.

According to the third embodiment, the coupling coefficient K between the excitation loop antenna 52 and the transmission/reception loop antenna 53 can be set as a relatively large value so that a broad frequency property can be achieved. By limiting the height of the columnar portion 63 of the magnetic member 51, the protrusion of the magnetic member 51 from the base board 61 can be minimized, and the overall size of the transmission/reception system can be made small enough to be accommodated in the limited space of a lap-top computer, a portable information terminal, a mobile phone or the like.

Figure 24:
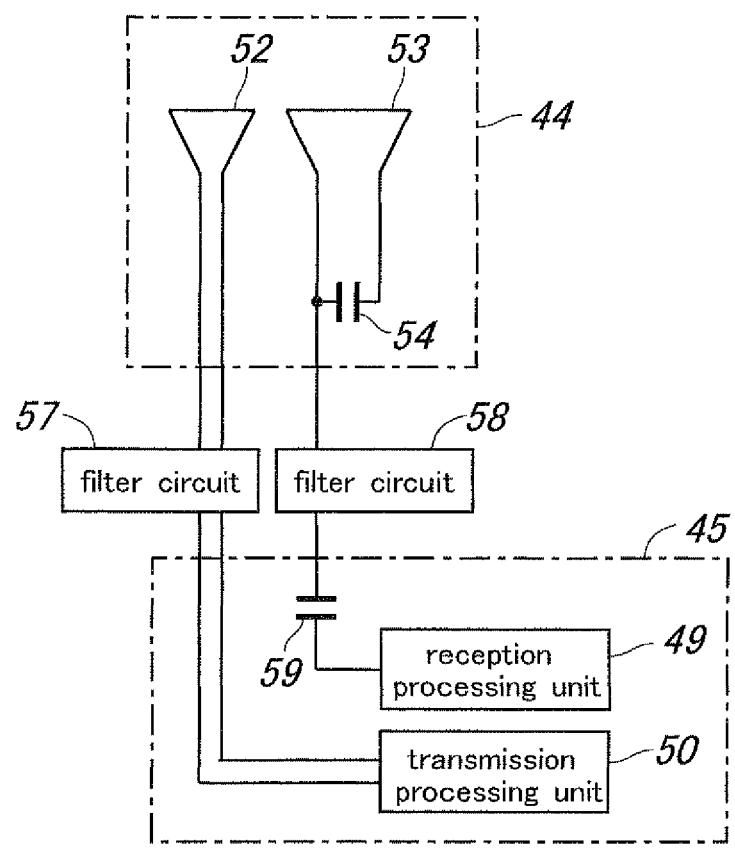
FIG. 24 is a block diagram of an essential part of the transmission/reception device.

The coupling capacitor provided on the reception signal path is described in the following with reference to FIG. 24. FIG. 24 is a simplified diagram of the transmission/reception device 52.

In the transmission/reception antenna 44, the excitation loop antenna 52 and the transmission/reception loop antenna 53 are brought close to each other so that the transmission signal transmitted from the excitation loop antenna 52 to the transmission/reception loop antenna 53 may be amplified by magnetic induction. Therefore, the transmission signal transmitted from the excitation loop antenna 52 to the transmission/reception loop antenna 53 is passed on to the reception processing unit 49. Meanwhile, the transmission/reception loop antenna 53 receives the signal transmitted from the wireless communication medium 41, and the received reception signal is forwarded to the reception processing unit 49. Therefore, although the transmission/reception loop antenna 53 does not receive any supply of electric power, a large level difference may be created between the transmission signal and the reception signal.

In particular, when the coupling coefficient K between the excitation loop antenna 52 and the transmission/reception loop antenna 53 is in the range of 0.5 to 0.7, the signal level of the transmission signal passed on to the reception processing unit 49 may become greater than the reception signal, and such an occurrence causes a problem in processing the reception signal by the reception processing unit 49.

Therefore, in the third embodiment, the transmission/reception loop antenna 53 is connected to the reception processing unit 49 via a coupling capacitor 59. This reduces the transmission signal that passes on to reception processing unit 49 so that the interferences between the transmission signal and the reception signal can be controlled, and the processing of the reception signal by the reception processing unit 49 can be performed in a proper manner. The capacitance of the coupling capacitor 59 may be selected as an appropriate value (3 pF, for instance) according to the frequencies and other properties of the transmission signal and the reception signal so as to provide a high impedance to the transmission signal.

Figure 25:
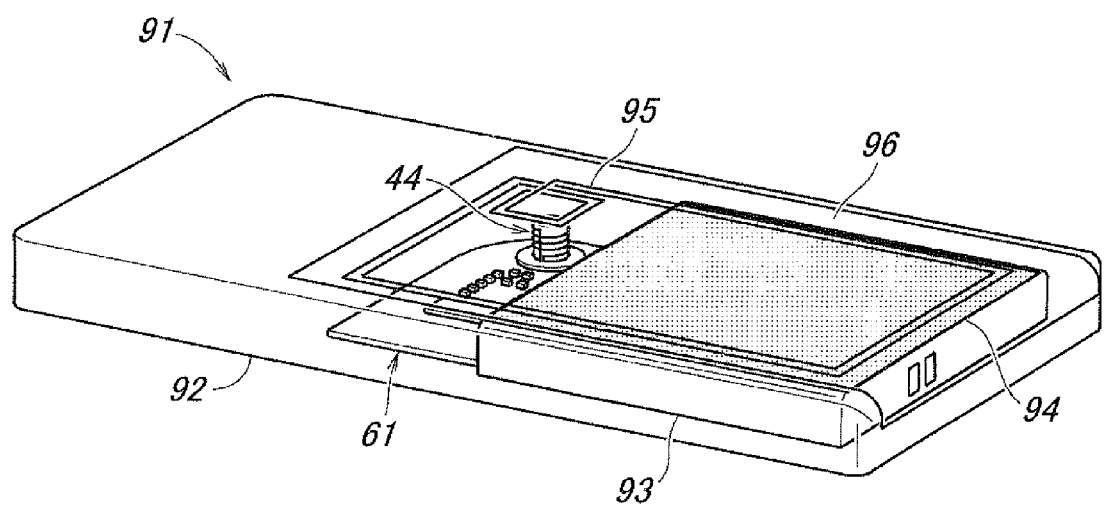
FIG. 25 is a see-through perspective view of a mobile telephone device 91 incorporated with the transmission/reception antenna of the third embodiment.
Figure 26:
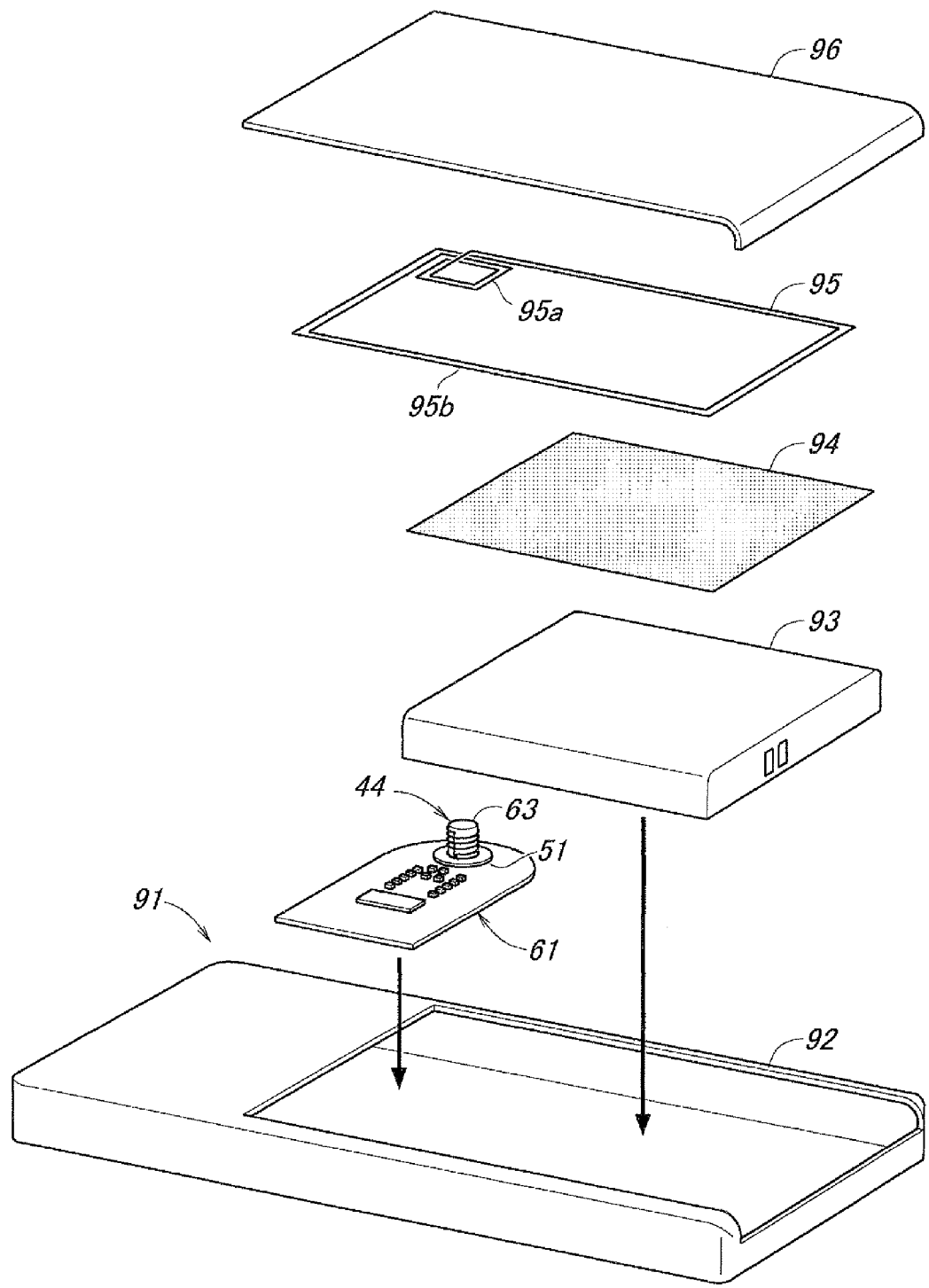
FIG. 26 is an exploded perspective view of the mobile telephone device 91.

The transmission/reception antenna 44 constructed in this manner can be advantageously used for a mobile telephone device. FIG. 25 is a perspective view showing an example where the transmission/reception antenna 44 is applied to a mobile telephone device 91. In FIG. 25, the housing 92 of the mobile telephone device 91 is depicted as transparent for the purpose of showing the component parts received therein. FIG. 26 is an exploded perspective view of the mobile telephone device 91.

As shown in FIGS. 25 and 26, the housing 92 of the mobile telephone device 91 receives therein a base board 61 supporting a transmission/reception antenna 44, a battery pack 93, a magnetic sheet 94 and a passive loop antenna 95, and an opening of the housing 92 is closed by a lid member 96.

As shown in FIG. 26, the transmission/reception antenna 44 is placed in the housing 92 so that the central axial line of the columnar portion 63 of the magnetic member 51 is directed in the thickness-wise direction of the housing 92. The passive loop antenna 95 is configured so as to provide a uniform sensitivity over the entire housing 92, and includes a small loop 95a centered around the transmission/reception antenna 44 and a large loop 95b extending along the periphery of the housing 92. The magnetic sheet 94 is disposed between the battery pack 93 and the passive loop 95 to prevent the metallic surface of the battery pack 93 from magnetically affecting the passive loop antenna 95.

In the foregoing embodiment, the columnar portion 63 was cylindrical in shape or has a circular cross section, and the excitation loop antenna 52 and the transmission/reception loop antenna 53 were provided with circular loops. However, the present invention is not limited by this example. For instance, the columnar portion may be provided with a prismatic shape having a rectangular or other polygonal cross section, and the excitation loop antenna 52 and the transmission/reception loop antenna 53 may be provided with rectangular or other polygonal loops.

In the foregoing embodiment, the columnar portion 63 was provided with a uniform circular cross section, and the excitation loop antenna 52 and the transmission/reception loop antenna 53 had a same diameter. However, the present invention is not limited by this example. For instance, the excitation loop antenna 52 and the transmission/reception loop antenna 53 may have different diameters, and the diameter of the columnar portion may be varied along the length thereof so as to adapt to the different diameters of the excitation loop antenna 52 and the transmission/reception loop antenna 53.

More specifically, the part of the columnar portion provided with the excitation loop coil may have a smaller cross section than the part of the columnar portion provided with the transmission/reception loop antenna when the excitation loop antenna 52 has a smaller diameter than the transmission/reception loop antenna 53. Conversely, the part of the columnar portion provided with the excitation loop coil may have a larger cross section than the part of the columnar portion provided with the transmission/reception loop antenna when the excitation loop antenna 52 has a larger diameter than the transmission/reception loop antenna 53. It is also possible to give the columnar portion a progressively larger or smaller diameter toward the free end thereof, the diameters of the excitation loop antenna 52 and the transmission/reception loop antenna 53 may be conformed to the varied diameter of the columnar portion.

Although the present invention has been described in terms of preferred embodiments thereof, it is obvious to a person skilled in the art that various alterations and modifications are possible without departing from the scope of the present invention which is set forth in the appended claims.

The contents of the original Japanese patent applications on which the Paris Convention priority claim is made for the present application are incorporated in this application by reference.

The invention claimed is:

1. A transmission/reception antenna, comprising:
a magnetic member;
an excitation loop antenna disposed on the magnetic member;
a pair of transmission processing unit connecting terminals connected to the excitation loop antenna and configured to be connected to a transmission processing unit;
a transmission/reception loop antenna disposed on the magnetic member adjacent to but not in contact with the excitation loop antenna, and including a first loop of a plurality of turns, a second loop of a plurality of turns and a connecting portion connecting one end of the first loop to one end of the second loop;
a pair of reception processing unit connecting terminals connected to opposite ends of the first and second loops to the one ends thereof and configured to be connected to a reception processing unit; and
a resonance capacitor connected between the opposite ends of the first and second loops of the transmission/reception loop antenna;
wherein the first and second loops of the transmission/reception loop antenna are located on either side of the excitation loop antenna, and
wherein the transmission processing unit connecting terminals are located on either side of the resonance capacitor.

2. A transmission/reception antenna, comprising:
a magnetic member;
an excitation loop antenna disposed on the magnetic member;
a pair of transmission processing unit connecting terminals connected to the excitation loop antenna and configured to be connected to a transmission processing unit;
a transmission/reception loop antenna disposed on the magnetic member adjacent to but not in contact with the excitation loop antenna, and including a first loop of a plurality of turns, a second loop of a plurality of turns and a connecting portion connecting one end of the first loop to one end of the second loop;
a pair of reception processing unit connecting terminals connected to opposite ends of the first and second loops to the one ends thereof and configured to be connected to a reception processing unit; and
a resonance capacitor connected between the opposite ends of the first and second loops of the transmission/reception loop antenna;
wherein the first and second loops of the transmission/reception loop antenna are located on either side of the excitation loop antenna, and
wherein one of the excitation loop antenna and the transmission/reception loop antenna is wound directly around the magnetic member, and the other of the antennas is wound around the one antenna via an insulating layer.

3. A transmission/reception antenna, comprising:
a magnetic member;
an excitation loop antenna disposed on the magnetic member:
a transmission/reception loop antenna disposed on the magnetic member adjacent to but not in contact with the excitation loop antenna; and
a resonance capacitor connected between two ends of the transmission/reception loop antenna;
wherein the magnetic member comprises a base portion configured to be fixedly attached to a base board and a columnar portion extending from the base portion perpendicularly with respect to a major plane of the base portion; and
wherein the excitation loop antenna includes a loop of a single turn wound around the columnar portion of the magnetic member and the transmission/reception loop antenna includes a loop of a plurality of turns wound around the columnar portion of the magnetic member coaxially with respect to the loop of the excitation loop antenna, and
wherein the excitation loop antenna is disposed on a part of the columnar portion adjacent to the base portion, and the transmission/reception loop antenna is disposed on a part of the columnar portion comparatively remote from the base portion.

4. A transmission/reception antenna, comprising:
a magnetic member;
an excitation loop antenna disposed on the magnetic member:
a transmission/reception loop antenna disposed on the magnetic member adjacent to but not in contact with the excitation loop antenna; and
a resonance capacitor connected between two ends of the transmission/reception loop antenna;
wherein the magnetic member comprises a base portion configured to be fixedly attached to a base board and a columnar portion extending from the base portion perpendicularly with respect to a major plane of the base portion; and
wherein the excitation loop antenna includes a loop of a single turn wound around the columnar portion of the magnetic member and the transmission/reception loop antenna includes a loop of a plurality of turns wound around the columnar portion of the magnetic member coaxially with respect to the loop of the excitation loop antenna, and
wherein the base portion has a greater diameter than the excitation loop antenna and the transmission/reception loop antenna.

5. A transmission/reception device, comprising:
a transmission/reception antenna according to claim 1;
a transmission processing unit for forwarding a transmission signal to the transmission/reception antenna;
a reception processing unit for receiving a reception signal from the transmission/reception antenna; and
a control unit for controlling the transmission processing unit and the reception processing unit;
wherein the excitation loop antenna is connected to the transmission processing unit, and the transmission/reception loop antenna is connected to the reception processing unit.

6. A transmission/reception device, comprising:
a transmission/reception antenna according to claim 2;

a transmission processing unit for forwarding a transmission signal to the transmission/reception antenna;
a reception processing unit for receiving a reception signal from the transmission/reception antenna; and
a control unit for controlling the transmission processing unit and the reception processing unit;
wherein the excitation loop antenna is connected to the transmission processing unit, and the transmission/reception loop antenna is connected to the reception processing unit.

7. A transmission/reception device, comprising:
a transmission/reception antenna according to claim 3;
a transmission processing unit for forwarding a transmission signal to the transmission/reception antenna;
a reception processing unit for receiving a reception signal from the transmission/reception antenna; and
a control unit for controlling the transmission processing unit and the reception processing unit;
wherein the excitation loop antenna is connected to the transmission processing unit, and the transmission/reception loop antenna is connected to the reception processing unit.

8. A transmission/reception device, comprising:
a transmission/reception antenna according to claim 4;
a transmission processing unit for forwarding a transmission signal to the transmission/reception antenna;
a reception processing unit for receiving a reception signal from the transmission/reception antenna; and
a control unit for controlling the transmission processing unit and the reception processing unit;
wherein the excitation loop antenna is connected to the transmission processing unit, and the transmission/reception loop antenna is connected to the reception processing unit.

\* \* \* \* \*